US012745254B2

(12) United States Patent
Kuang et al.

(10) Patent No.: US 12,745,254 B2
(45) Date of Patent: Sep. 22, 2026

(54) USER EQUIPMENT AND BASE STATION

(71) Applicant: Panasonic Intellectual Property Corporation of America, Torrance, CA (US)

(72) Inventors: Quan Kuang, Langen (DE); Hidetoshi Suzuki, Kanagawa (JP); Hongchao Li, Langen (DE); Ayako Horiuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 657 days.

(21) Appl. No.: 18/005,579

(22) PCT Filed: Jul. 1, 2021

(86) PCT No.: PCT/EP2021/068203

§ 371 (c)(1), (2) Date: Jan. 13, 2023

(87) PCT Pub. No.: WO2022/012956

PCT Pub. Date: Jan. 20, 2022

(65) Prior Publication Data

US 2023/0269742 A1 Aug. 24, 2023

(30) Foreign Application Priority Data

Jul. 16, 2020 (EP) .................................... 20186155

(51) Int. Cl.
*H04W 72/23* (2023.01)
*H04W 72/1263* (2023.01)
*H04W 72/566* (2023.01)

(52) U.S. Cl.
CPC ....... *H04W 72/23* (2023.01); *H04W 72/1263* (2013.01); *H04W 72/569* (2023.01)

(58) Field of Classification Search
None
See application file for complete search history.

(56) References Cited

U.S. PATENT DOCUMENTS 10,660,020 B2 5/2020 Sun et al.
2022/0159702 A1* 5/2022 Seo ....................... H04L 5/0094

(Continued)

FOREIGN PATENT DOCUMENTS

JP 2019530357 A 10/2019
WO 2019138912 A1 7/2019

OTHER PUBLICATIONS

3GPP, "3rd Generation Partnership Project; Technical Specification Group Radio Access Network; Study on Scenarios and Requirements for Next Generation Access Technologies; (Release 15)," 3GPP TR 38.913 V15.0.0, Jun. 2018. (39 pages).

(Continued)

*Primary Examiner* — Kouroush Mohebbi
(74) *Attorney, Agent, or Firm* — Seed Intellectual Property Law Group LLP

(57) ABSTRACT

The present disclosure relates to a user equipment (UE), comprising the following. A processor of the UE operates a monitoring function that involves monitoring of a downlink control channel for receiving a downlink control information message based on one of a plurality of groups of search space sets. A receiver of the UE receives a downlink control information message via the monitored downlink control channel, wherein the received downlink control information message allocates transmission or reception of data to the UE. The processor further determines one group of the plurality of groups of search space sets for performing the monitoring function of the downlink control channel The (Continued)

determining the one group of search space sets is based on the content or the format of the received downlink control information message.

11 Claims, 13 Drawing Sheets

(56) References Cited

U.S. PATENT DOCUMENTS

| | | | | |
|---|---|---|---|---|
| 2023/0054007 A1* | 2/2023 | Kim | H04L 5/0053 | |
| 2023/0156572 A1* | 5/2023 | Reial | H04W 52/0216 | 370/329 |
| 2023/0188305 A1* | 6/2023 | Bagheri | H04L 5/0053 | 370/329 |
| 2023/0262599 A1* | 8/2023 | Jung | H04L 5/0007 | 370/311 |

OTHER PUBLICATIONS

3GPP, "3rd Generation Partnership Project; Technical Specification Group Radio Access Network; NR; NR and NG-RAN Overall Description; Stage 2 (Release 16)," 3GPP TS 38.300 V16.0.0, Dec. 2019. (101 pages).
3GPP, "3rd Generation Partnership Project; Technical Specification Group Radio Access Network; NR; Physical channels and modulation (Release 16)," 3GPP TS 38.211 V16.0.0, Dec. 2019. (129 pages).
3GPP, "3rd Generation Partnership Project; Technical Specification Group Services and System Aspects; System architecture for the 5G System (5GS); Stage 2 (Release 16)," 3GPP TS 23.501 V16.3.0, Dec. 2019. (417 pages).
3GPP, "3rd Generation Partnership Project; Technical Specification Group Radio Access Network; NR; Multiplexing and channel coding (Release 16)," 3GPP TS 38.212 V16.1.0, Mar. 2020. (146 pages).
3GPP, "3rd Generation Partnership Project; Technical Specification Group Radio Access Network; NR; Physical layer procedures for control (Release 16)," 3GPP TS 38.213 V16.1.0, Mar. 2020. (156 pages).
3GPP, "3rd Generation Partnership Project; Technical Specification Group Radio Access Network; NR; Radio Resource Control (RRC) protocol specification (Release 16)," 3GPP TS 38.331 V16.0.0, Mar. 2020. (835 pages).
3GPP, "3rd Generation Partnership Project; Technical Specification Group Radio Access Network; NR; Physical layer procedures for data (Release 16)," 3GPP TS 38.214 V16.1.0, Mar. 2020. (151 pages).
3GPP, "3rd Generation Partnership Project; Technical Specification Group Radio Access Network; NR; Medium Access Control (MAC) protocol specification (Release 16)," 3GPP TS 38.321 V16.0.0, Mar. 2020. (141 pages).
Extended European Search Report, dated Dec. 14, 2020, for European Patent Application No. 20186155.6. (10 pages).
International Search Report, mailed Oct. 12, 2021, for International Patent Application No. PCT/EP2021/068203. (4 pages).
LG Electronics, "Remaining issues of DL signals and channels for NR-U," R1-2001933, Agenda Item: 7.2.2.1.2, 3GPP TSG RAN WG1 #100bis, e-Meeting, Apr. 20-30, 2020. (9 pages).
Qualcomm Incorporated, "Summary of NR-U agreements till RAN1 #99," R1-1913599, Agenda item: 7.2.2, 3GPP TSG RAN WG1 Meeting #99, Reno, USA, Nov. 18-22, 2019. (40 pages).
OPPO, "Discussion on the remaining issues of DL signals and channels," R1-2004083, Agenda Item: 7.2.2.1.2, 3GPP TSG RAN WG1 #101-E, May 25-Jun. 5, 2020. (8 pages).

* cited by examiner

USER EQUIPMENT AND BASE STATION

FIELD OF THE PRESENT DISCLOSURE

The present disclosure is directed to methods, devices and articles in communication systems, such as 3GPP communication systems.

TECHNICAL BACKGROUND

Currently, the 3rd Generation Partnership Project (3GPP) works at the technical specifications for the next generation cellular technology, which is also called fifth generation (5G).

One objective is to provide a single technical framework addressing all usage scenarios, requirements and deployment scenarios (see, e.g., section 6 of TR 38.913 version 15.0.0), at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC deployment, scenarios may include scenarios with large number of devices with non-time critical data transfers such as smart wearables and sensor networks. The services eMBB and URLLC are similar in that they both demand a very broad bandwidth, however are different in that the URLLC service may preferably require ultra-low latencies.

A second objective is to achieve forward compatibility. Backward compatibility to Long Term Evolution (LTE, LTE-A) cellular systems is not required, which facilitates a completely new system design and/or the introduction of novel features.

SUMMARY

One non-limiting and exemplary embodiment facilitates providing procedures for facilitating a UE to perform an improved downlink control channel monitoring procedure.

In an embodiment, the techniques disclosed here feature a user equipment comprising the following. A processor of the UE operates a monitoring function that involves monitoring of a downlink control channel for receiving a downlink control information message based on one of a plurality of groups of search space sets. A receiver of the UE receives a downlink control information message via the monitored downlink control channel, wherein the received downlink control information message allocates transmission or reception of data to the UE. The processor further determines one group of the plurality of groups of search space sets for performing the monitoring function of the downlink control channel. The determining the one group of search space sets is based on:

the content or the format of the received downlink control information message.

It should be noted that general or specific embodiments may be implemented as a system, a method, an integrated circuit, a computer program, a storage medium, or any selective combination thereof. For instance, an integrated circuit can control a process of a UE or base station.

Additional benefits and advantages of the disclosed embodiments and different implementations will be apparent from the specification and figures. The benefits and/or advantages may be individually obtained by the various embodiments and features of the specification and drawings, which need not all be provided in order to obtain one or more of such benefits and/or advantages.

BRIEF DESCRIPTION OF THE FIGURES

In the following exemplary embodiments are described in more detail with reference to the attached figures and drawings.

FIG. 1 shows an exemplary architecture for a 3GPP NR system;

FIG. 2 is a schematic drawing that shows a functional split between NG-RAN and 5GC, FIG. 3 is a sequence diagram for RRC connection setup/reconfiguration procedures.

DETAILED DESCRIPTION

Figure 4:
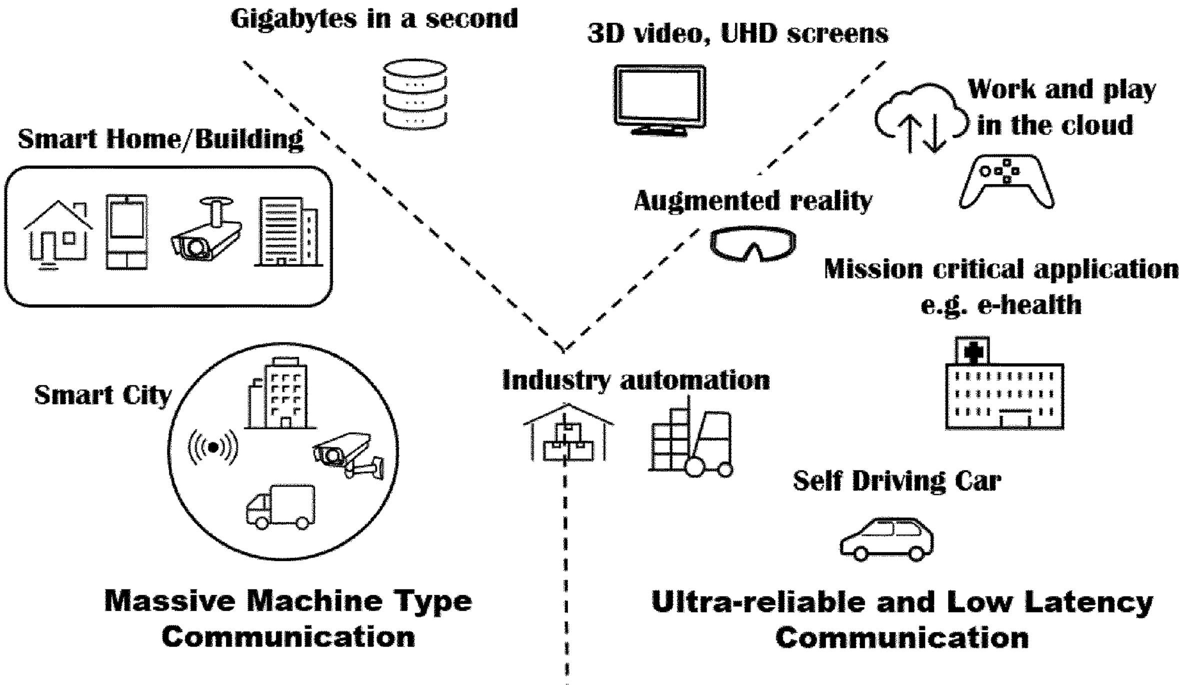
FIG. 4 is a schematic drawing showing usage scenarios of Enhanced mobile broadband (eMBB), Massive Machine Type Communications (mMTC) and Ultra Reliable and Low Latency Communications (URLLC)

5G NR System Architecture and Protocol Stacks

3GPP has been working at the next release for the $5^{th}$ generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figures 1, 2, 3:
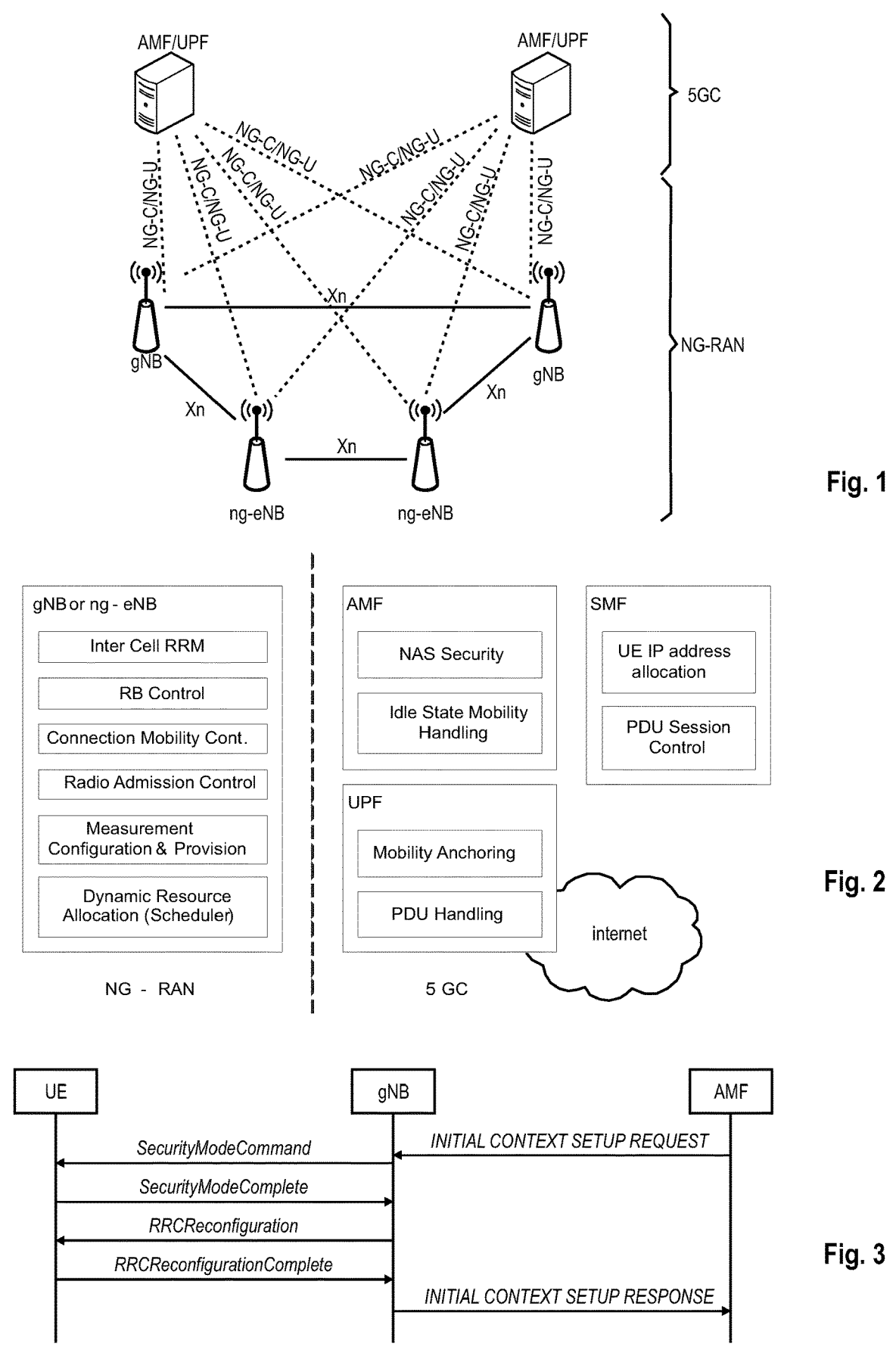

Among other things, the overall system architecture assumes an NO-RAN (Next Generation-Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AME (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v16.0.0, section 4).

The user plane protocol stack for NR (see, e.g., 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For instance, the physical channels are PRACH (Physical Random Access Channel), PUSCH (Physical Uplink Shared Channel) and PUCCH (Physical Uplink Control Channel) for uplink and PDSCH (Physical Downlink Shared Channel), PDCCH (Physical Downlink Control Channel) and PBCH (Physical Broadcast Channel) for downlink.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability ($1\text{-}10^{-5}$ within Ims). mMTC may preferably require high connection density (1,000,000 devices/$km^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30kHz, 60 kHz . . . are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v16.0.0, e.g., section 4). For instance, downlink and uplink transmissions are organized into frames with 10 ms duration, each frame consisting of ten subframes of respectively 1 ms duration. In 5 g NR implementations the number of consecutive OFDM symbols per subframe depends on the subcarrier-spacing configuration. For example, for a 15-kHz subcarrier spacing, a subframe has 14 OFDM symbols (similar to an LTE-conformant implementation, assuming a normal cyclic prefix). On the other hand, for a 30-kHz subcarrier spacing, a subframe has two slots, each slot comprising 14 OFDM symbols.

5G NR Functional Split Between NG-RAN and 5GC

FIG. 2 illustrates functional split between NG-RAN and 5GC. NG-RAN logical node is a gNB or ng-eNB. The 5GC has logical nodes AMP, UPF and SMF.

In particular, the gNB and ng-eNB host the following main functions:

- Functions for Radio Resource Management such as Radio Bearer Control, Radio Admission Control. Connection Mobility Control. Dynamic allocation of resources to UEs in both uplink and downlink (scheduling);

IP header compression, encryption and integrity protection of data;

Selection of an AMF at UE attachment when no routing to an AMF can be determined from the information provided by the UE;

Routing of User Plane data towards UPF(s);

Routing of Control Plane information towards AMF;

Connection setup and release;

Scheduling and transmission of paging messages;

Scheduling and transmission of system broadcast information (originated from the AMF or OAM);

Measurement and measurement reporting configuration for mobility and scheduling;

Transport level packet marking in the uplink;

Session Management;

Support of Network Slicing;

QoS Flow management and mapping to data radio bearers;

Support of UEs in RRC_INACTIVE state;

Distribution function for NAS messages;

Radio access network sharing;

Dual Connectivity;

Tight interworking between NR and E-UTRA.

The Access and Mobility Management. Function (AMF) hosts the following main functions:

Non-Access Stratum, NAS, signalling termination;

NAS signalling security;

Access Stratum, AS, Security control;

Inter Core Network, CN, node signalling for mobility between 3GPP access networks;

Idle mode UE Reachability (including control and execution of paging retransmission);

Registration Area management;

Support of intra-system and inter-system mobility;

Access Authentication;

Access Authorization including check of roaming rights;

Mobility management control (subscription and policies);

Support of Network Slicing;

Session Management Function, SMF, selection.

Furthermore, the User Plane Function, UPF, hosts the following main functions:

Anchor point for Intra-/Inter-RAT mobility (when applicable);

External PDU session point of interconnect to Data Network;

Packet routing & forwarding;

Packet inspection and User plane part of Policy rule enforcement;

Traffic usage reporting;

Uplink classifier to support routing traffic flows to a data network;

Branching point to support multi-horned PDU session;

QoS handling for user plane, e.g., packet filtering, gating, UL/DL rate enforcement;

Uplink Traffic verification (SDF to QoS flow mapping);

Downlink packet buffering and downlink data notification triggering.

Finally, the Session Management function, SMF, hosts the following main functions:

Session Management;

UE IP address allocation and management;

Selection and control of UP function;

Configures traffic steering at User Plane Function, UPF, to route traffic to proper destination;

Control part of policy enforcement and QoS;

Downlink Data Notification.

RRC Connection Setup and Reconfiguration Procedures

FIG. 3 illustrates some interactions between a UE, gNB, and AMF (a 5GC entity) in the context of a transition of the UE from RRC_IDLE to RRC_CONNECTED for the NAS part (see TS 38.300).

RRC is a higher layer signaling (protocol) used for UE and gNB configuration. In particular, this transition involves that the AMF prepares the UE context data (including, e.g., PDU session context, the Security Key, UE Radio Capability and UE Security Capabilities, etc.) and sends it to the gNB with the CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signalling-only connection, the steps relating to the RRCReconfiguration are skipped since SRB2 and DRBs are not setup. Finally, the gNB informs the AME that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element (IE) to the UE via the signaling radio bearer. The. UE then performs an uplink transmission or a downlink reception based on the resource allocation configuration.

Usage Scenarios of IMT for 2020 and Beyond

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 4 illustrates some examples of envisioned usage scenarios for IMT for 2020 and beyond (see, e.g., ITU-R M.20183 FIG. 2).

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913 version 15.0.0. For NR URLLC in Release 15, key requirements include a target user plane latency of 0.5 ms for UL (uplink) and 0.5 ms for DL (downlink). The general URLLC requirement for one transmission of a packet is a BLEB (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR. URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent, of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to $10^6$ (P level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also, PUSCH enhancements related to mini-slot level hopping and retransmission/repetition enhancements have been identified. The terra "mini-slot" refers to a Transmission Time Interval (TTI) including a smaller number of symbols than a slot (a slot comprising fourteen symbols).

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g., as shown above with reference to FIG. 3. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 5:
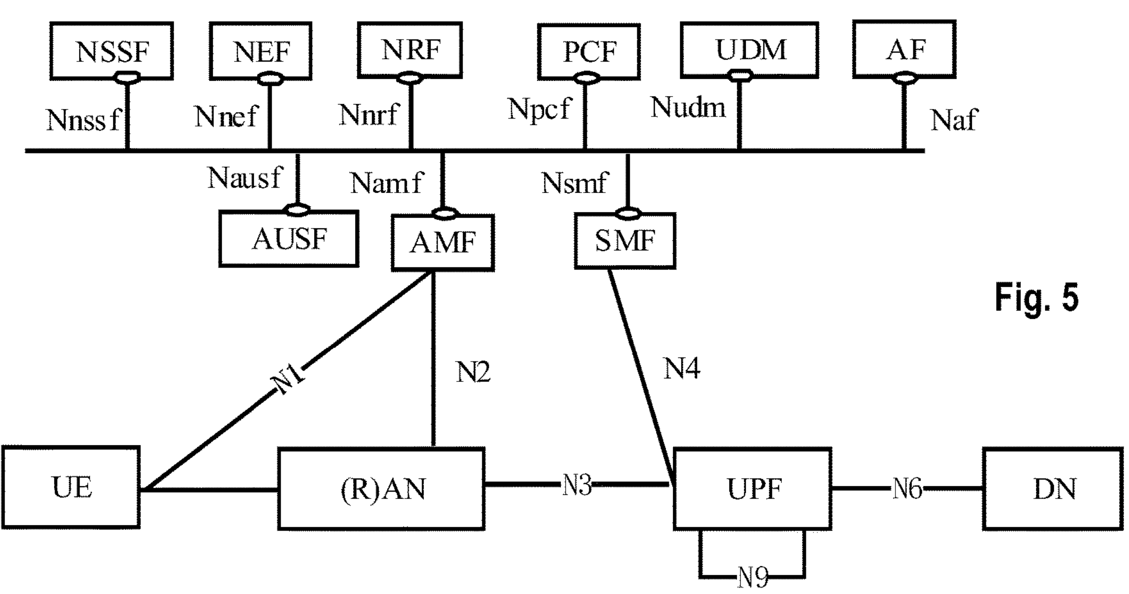
FIG. 5 is a block diagram showing an exemplary 5G system architecture for a non-roaming scenario.

FIG. 5 illustrates a 5G NR non-roaming reference architecture (see TS 23.501 v16.3.0, section 4.2.3). An Application Function (AF), e.g., an external application server hosting 5G services, exemplarily described in FIG. 4, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions, Application Functions not allowed by the operator to access directly the Network Functions use the external exposure framework via the NEF to interact with relevant Network Functions.

FIG. 5 shows further functional units of the 5G architecture, namely Network Slice Selection Function (NSSF), Network Repository Function (NRF), Unified Data Management (UDM), Authentication Server Function (AUSF), Access and Mobility :Management Function (AMF), Session Management Function (SMF), and Data Network (DN), e.g., operator services, Internet access or 3rd party services. All of or a part of the core network functions and the application services may be deployed and running on cloud computing environments.

In the present disclosure, thus, an application server (for example, AF of the 5G architecture), is provided that comprises a transmitter, which, in operation, transmits a request containing a QoS requirement for at least one of URLLC, eMBB and mMTC services to at least one of functions (for example NEF, AMF, SMF, PCF, UPF, etc.) of the 5GC to establish a PDU session including a radio bearer between a gNodeB and a UE in accordance with the QoS requirement and control circuitry, which, in operation, performs the services using the established PDU session.

Bandwidth Parts

NR systems will support much wider maximum channel bandwidths than LTE's 20 MHz (e.g., 100 s of MHz). Wideband communication is also supported in LTE via carrier aggregation (CA) of up to 20 MHz component carriers. By defining wider channel bandwidths in NR, it is possible to dynamically allocate frequency resources via scheduling, which can be more efficient and flexible than the Carrier Aggregation operation of LTE, whose activation/ deactivation is based on MAC Control Elements. Having single wideband carrier also has merit in terms of low control overhead as it needs only single control signaling (Carrier Aggregation requires separate control signaling per each aggregated carrier).

Moreover, like LTE, NR may also support the aggregation of multiple carriers via carrier aggregation or dual connectivity.

Since UEs are not always demanding high data rates, the use of a wide bandwidth may incur higher idling power consumption both from RF and baseband signal processing perspectives. In this regard, a newly developed concept of bandwidth parts for NR provides a means of operating UEs with smaller bandwidths than the configured channel bandwidth, so as to provide an energy efficient solution despite the support of wideband operation. This low-end terminal, which cannot access the whole bandwidth for NR, can benefit therefrom.

A bandwidth part (BWP) is a subset of the total cell bandwidth of a cell, e.g., the location and number of contiguous physical resource blocks (PRBs). It may be defined separately for uplink and downlink. Furthermore, each bandwidth part can be associated with a specific OFDM numerology, e.g., with a subcarrier spacing and cyclic prefix. For instance, bandwidth adaptation is achieved by configuring the UE with BWP(s) and telling the UE which of the configured BWPs is currently the active one.

Exemplarily, in 5G NR, a specific BWP is configured only for a UE in RRC_Connected state. For instance, other than an initial BWP (e.g., respectively one for UL and one for DL), a BWP only exists for UEs in connected state. To support the initial data exchange between the UE and the network, e.g., during the process of moving a UE from RRC_IDLE or RRC_INACTIVE state to RRC_CONNECTED state, the initial DL BWP and initial UL BWP are configured in the minimum system information.

Although the UE can be configured with more than one BWP (e.g., up to 4 BWP per serving cell, as currently defined for NR), the UE has only one active DL BWP at a time.

Switching between configured BWPs may be achieved for instance by means of downlink control information (DCIs).

For the Primary Cell (PCell), the initial BWP is the BWP used for initial access, and the default BWP is the initial one unless another initial BWP is explicitly configured. For a Secondary Cell (SCell), the initial BWP is always explicitly configured, and a default BWP may also be configured. When a default BWP is configured for a serving cell, the expiry of an inactivity timer associated to that cell switches the active BWP to the default one.

Some DCI formats do not contain the BWP ID (such as Formats 0_0 and 1_0), while in other DCI formats the number of bits for BWP ID is RRC-configurable and could be 0, 1, 2 bits (such as for Formats 0_1, 0_2, 1_1, and 1_2).

Figures 6, 7:
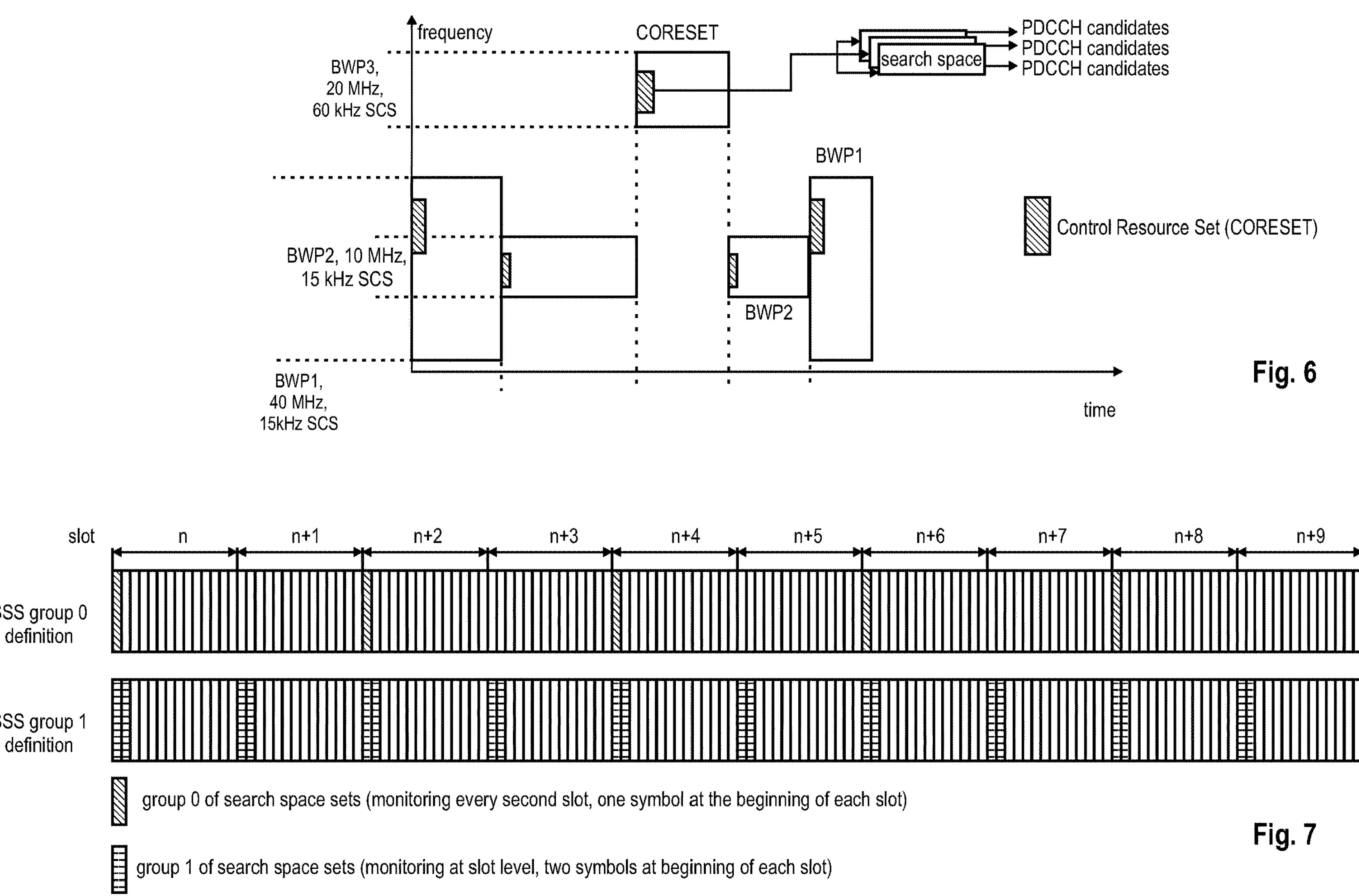
FIG. 6 illustrates the relationship between different bandwidth parts, CORESETS, search spaces and PDCCH candidates.
FIG. 7 illustrates the configuration of search space sets in different SSS groups.

FIG. 6 illustrates a scenario where three different BWPs are configured, BWP1 with a frequency bandwidth of 40 MHz and a subcarrier spacing of 15 kHz, BWP2 with a width of 10 MHz and a subcarrier spacing of 15 kHz, and BWP3 with a width of 20 MHz and subcarrier spacing of 60 kHz.

Control Information—Search Space Sets

PDCCH monitoring is done by the UE so as to identify and receive information intended for the UE, such as the control information as well as the user traffic (e.g., the DCI on the PDCCH, and the user data on the PDSCH indicated by the PDCCH).

Control information in the downlink (can be termed., e.g., downlink control information, DCI) has basically the same purpose in 5G NR as the DCI in LTE, namely being a special set of control information that, e.g., schedules a downlink data channel (e.g., the PDSCH) or an uplink data channel (e.g., PUSCH). In 5G NR there are a number of different DCI Formats defined already (see TS 38.212 v16.1.0 section 7.3.1). An overview is given by the following table.

| DCI format | Usage |
|---|---|
| 0_0 | Scheduling of PUSCH in one cell |
| 0_1 | Scheduling of PUSCH in one cell |
| 0_2 | Scheduling of PUSCH in one cell |
| 1_0 | Scheduling of PUSCH in one cell |
| 1_1 | Scheduling of PUSCH in one cell |
| 1_2 | Scheduling of PUSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Cancel UL transmission |
| 2_5 | Notify availability of soft resources |
| 2_6 | Notify power saving information |
| 3_0 | Scheduling for Sidelink, NR PSCCH and NR PSSCH in one cell; |
| 3_1 | Scheduling for Sidelink; LTE PSCCH and LTE PSSCH in one cell |

In 5G NR, PDCCH is transmitted in radio resource regions called control resource sets (CORESETs). In LTE, the concept of a CORESET is not explicitly present. Instead, PDCCH in LTE uses the full carrier bandwidth in the first 1-3 OFDM symbols (four for the most narrowband case). By contrast, a CORESET in NR can occur at any position within a slot and anywhere in the frequency range of the carrier, except that the UE is not expected to handle CORESETs outside its active bandwidth part (BMP).

Accordingly, a UE monitors a set of PDCCH candidates in one or more CORESETs on the active DL BWP on each activated serving cell configured with PDCCH monitoring using the corresponding search space sets, where monitoring implies decoding each PDCCH candidate according to the monitored DCI formats, e.g., as defined in 3GPP TS 38.213 version 16.1.0, sections 10 and 11.

In an exemplary 5G NR implementation, a search space may comprise a plurality of PDCCH candidates associated with the same aggregation level (e.g., where PDCCH candidates differ regarding the DCI formats to monitor). In turn, a search space set may comprise a plurality of search spaces of different aggregation levels, but being associated with the same CORESET. Unlike in LTE, as mentioned above, where control channels span the entire carrier bandwidth, the bandwidth of a CORESET can be configured, e.g., within an active DL frequency bandwidth part (BWP). Put differently, the CORESET configuration defines the frequency resources for the search space set and thus for the comprised PDCCH candidates of search spaces in the set. The CORESET configuration also defines the duration of the search space set, which can have a length of one to three OFDM symbols. On the other hand, the start time is configured by the search space set configuration itself, e.g., at which OFDM symbol the UE starts monitoring the PDCCH of the search spaces of the set. In combination, the configuration of the search space set and the configuration of the CORESET provide an unambiguous definition in the frequency and time domain about the PDCCH monitoring requirements of the UE. Both CORESET and search space set configurations can be semi-statically done via RRC The first CORESET, CORESET 0, is provided by the master information block (MIB) as part of the configuration of the initial bandwidth part to be able to receive the remaining system information and additional configuration information from the network. After connection setup, a UE can be configured with multiple COTESETs using RRC In NR, a flexible slot format can be configured for a UE by cell-specific and/or UE-specific higher-layer signaling in a semi-static downlink/uplink assignment manner, or by dynamically signaling via DCI Format 2_0 in the group-common PDCCH (GC-PDCCH). When the dynamic signaling is configured, a UE is to monitor the GC-PDCCH (DCI format 2_0) that carries the dynamic slot format indication (SFI). There are other fields, such as available RB set indicator, COT (Channel Occupancy Time) duration indicator, search space set monitoring group flag, as specified in TS 38.212 v16.1.0 section 7.3.1.3.1.

Conceptually, FIG. 6 provides an exemplary illustration of the relationship between bandwidth parts, CORESETS, search spaces and the PDCCH candidates that a UE can monitor. As apparent from FIG. 6, one CORESET is illustrated per BWP, although more than one are possible including both common and UE-specific CORESETs (e.g., up to 3 CORESETS per BWP). Each CORESET can then have several search spaces in turn with respectively one or more PDCCH candidates.

Search Space Set Group Switching

In 3GPP, the concept of configuring at least two groups of search space sets (abbreviated as SSS or SS set) for monitoring of the PDCCH has been discussed. This concept can be, e.g., specifically useful for operation in the unlicensed radio spectrum, where the gNB has to first acquire the channel in order to then be allowed to transmit a PDCCH.

For instance, the different SSS groups can differ by when and/or how long the UE is required to monitor the PDCCH during a slot. This is exemplarily illustrated in FIG. 7. As apparent therefrom, two different groups of search space sets are configured, where the group-0 SS set configuration requires PDCCH monitoring at a granularity of, e.g., every $2^{nd}$ slot (here the first OFDM symbol of the respective slot) and where the group-1 SS set configuration requires monitoring at slot granularity (here, e.g., the first two OFDM symbols of every slot). According to an exemplary 3GPP solution, the gNB is able to configure a search space to be monitored by the UE, by using the Information Element SearchSpace (see, e.g., TS 38.331 v16.0.0, section 6.3.2) including the monitoring slot periodicity using the parameter monitoringSlotPeriodicityAndOffset. The number of OFDM symbols to be monitored within the slot can be configured by the gNB using the parameter monitoringSymbolsWithinSlot, which can also be carried within the Information Element SearchSpace.

For instance, the UE is required to at least monitor the search spaces of the currently active SSS group. Moreover, there may be search space sets that are not part of the configured groups (e.g., a common search space set) that will always be monitored by the UE regardless of the active SSS group.

The various groups may comprise various search space sets. A single search space set can be part of more than one SSS group.

According to one exemplary aspect of the concept, the UE can be configured to switch between the groups. One particular exemplary implementation of a search space set switching is defined in the 3GPP specs for 5G NR, particularly TS 38.213 v16.1.0, section 10.4 "Search space set switching." A corresponding simplified and exemplary illustration of such a switching is provided in FIGS. 8A and 8B.

As apparent therefrom, switching between the search space set groups can be controlled explicitly and implicitly. The UE is configured, e.g., to either follow the implicit or explicit switching scheme, based on a configuration by the gNB (e.g., using a particular SearchSpaceSwitchTrigger-r16, as part of the Information Element SlotFormatIndicator (see TS 38.331 v16.0.0 section 6.3.2). For instance, it is exemplary assumed in the following that there are two SSS groups 0 and 1.

Figure 8A:
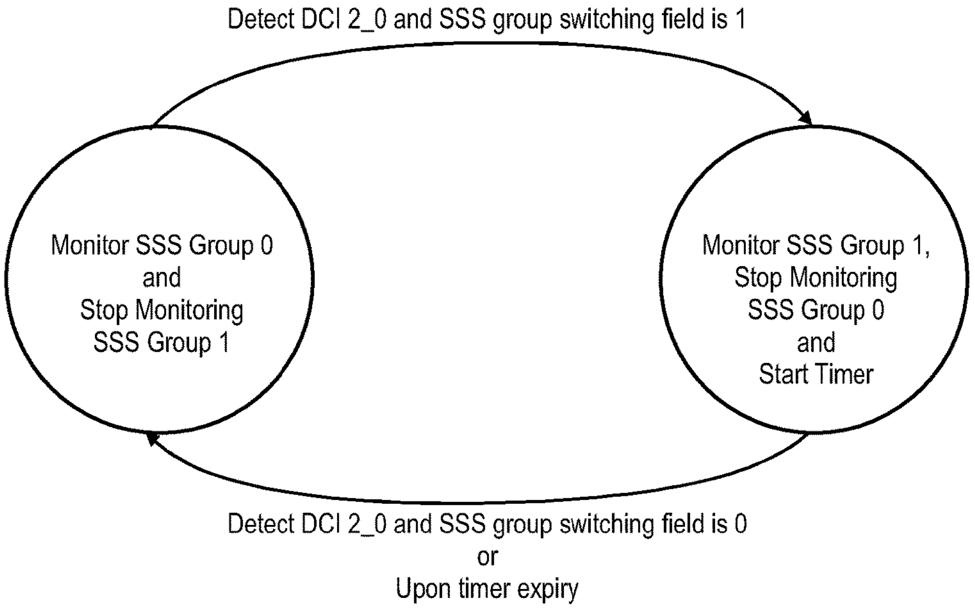
FIGS. 8A and 8B illustrate the switching between two search space set groups, according to an exemplary 5G NR standard implementation.
Figure 8B:
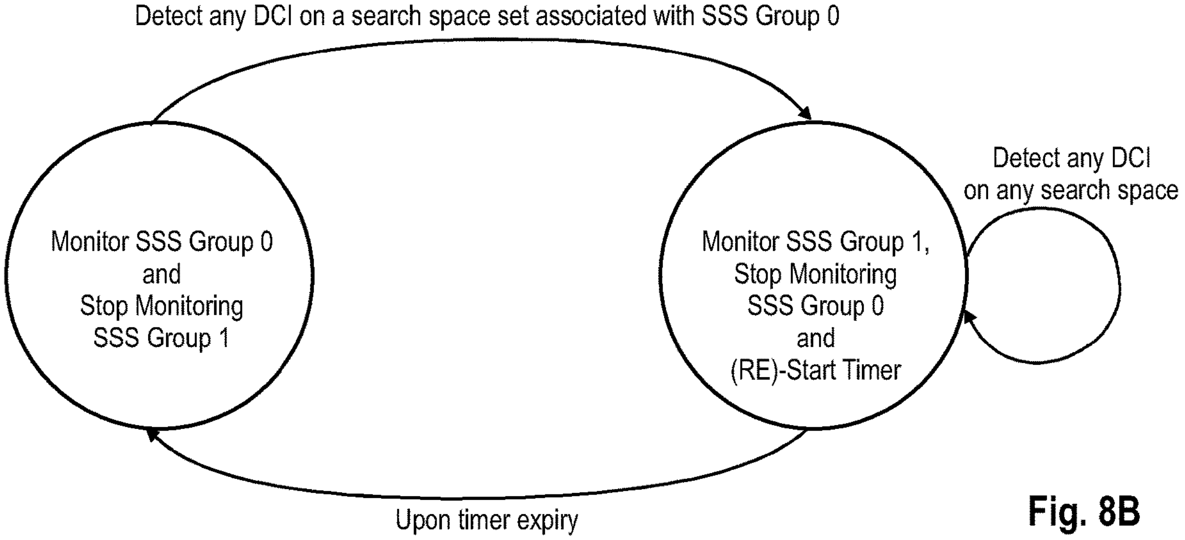

The explicit indication works based on a switching field value that is carried in a DCI of format 2_0 (see FIG. 8A). If the switching filed value indicates 0, the UE is instructed to monitor the PDCCH according to the search space sets with the indicated group index 0. Correspondingly, if not yet doing so, the UE starts the monitoring of the PDCCH occasions of SSS group 0 and stops monitoring the PDCCH occasions of SSS group 1.

As mentioned in previous section, DCI Format 2_0 currently can be used for notifying a group of UEs of the slot format, COT duration, available RB set, and search space group switching.

Conversely, if the switching filed value indicates 1, the UE is instructed to monitor the PDCCH according to the search space sets with the indicated group index 1. Correspondingly, if not yet doing so, the UE starts the monitoring of the PDCCH occasions of SSS group 1 and stops monitoring the PDCCH occasions of SSS group 0. Furthermore, the UE may set a suitable timer to a configured timer value. The timer is then used to switch back to PDCCH monitoring according to the SSS group 0, when the timer expires. Additionally, the UE may also switch back from PDCCH monitoring according to SSS group 1 to SSS group 0, after a channel occupancy duration for its serving cell.

The implicit SSS group switching is based on the monitoring of DCIs on the PDCCH. As apparent from FIG. 8B, if the UE detects any DCI on SSS group 0, the UE starts monitoring according to SSS group 1 and stops monitoring according to SSS group 0. Furthermore, a timer is started by the UE, where upon expiry of the timer, the switches back to monitoring according to SSS group 0. Otherwise, the UE keeps performing the PDCCH monitoring function according to SSS group 1.

Time-Domain Scheduling in 5G NR

In the time domain, transmissions in 5G NR are organized into frames of length 10 ms, each of which is divided into 10 equally sized subframes of length 1 ms. A subframe in turn is divided into slots consisting of 14 OFDM symbols each. The duration of a slot in milliseconds depends on the numerology. For instance, for the 15 kHz subcarrier spacing, an NR slot thus has the same structure as an LTE subframe with normal cyclic prefix. A subframe in NR serves as a numerology-independent time reference, which is useful, especially in the case of multiple numerologies being mixed on the same carrier, while a slot is the typical dynamic scheduling unit. This frame structure on which the 3GPP 5G NR communication is based in exemplarily illustrated in FIG. 9.

Figure 9:
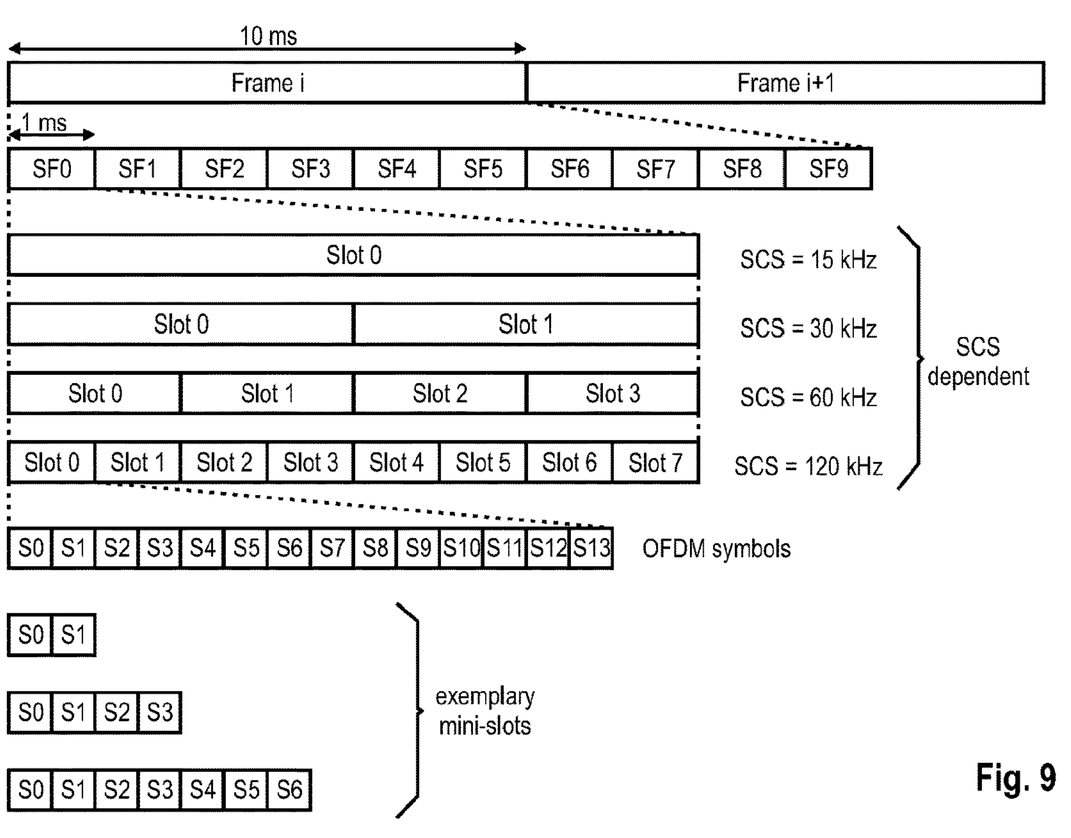
FIG. 9 illustrates the 5G NR frame structure, including frames, subframes, slots, OFDM symbols, as well as mini-slots.

3GPP NR further supports a more efficient approach to low-latency transmissions by allowing scheduling shorter slot sizes known as mini-slots, also illustrated in FIG. 9. The mini-slot-based (also called non-slot-based) transmissions can also preempt an already ongoing slot-based transmission to another device, allowing immediate transmission of application data requiring very low latency. Mini-slots can be used for low-latency application, such as URLLC and operation in unlicensed bands, for example, to start transmission directly after a successful listen-before-talk procedure without waiting for the slot boundary. More generally, mini-slots can be configured to span between one and thirteen OFDM symbols. For ease of illustration, the mini-slots illustrated in FIG. 9 exemplarily span two, four or seven OFDM symbols. For instance, the first symbol of a mini-slot includes (uplink-related or downlink-related) control information.

In the following, one exemplary implementation of time-domain resource allocation based on current 3GPP technical specifications will be presented. The following explanations are to be understood as a particular exemplary implementation of the time-domain resource allocation and should not be understood as the only possible time-domain resource allocation possible.

The time-domain allocation for the data to be received or transmitted is dynamically signaled in the DCI, which is useful because the part of a slot available for downlink reception or uplink transmission may vary from slot to slot as a result of the use of dynamic TDD or the amount of resources used for uplink control signaling. The slot in which the transmission occurs is signaled as part of the time-domain allocation. Although the downlink data in many cases is transmitted in the same slot as the corresponding resource assignment, this is frequently not the case, e.g., for uplink transmissions.

When the UE is scheduled to receive PDSCH or transmit PUSCH by a DCI, the Time Domain Resource Assignment (TDRA) field value of the DCI indicates a row index of a time-domain resource allocation (TDRA) table available to the UE and gNB. The term "table" is used herein, because the TDRA entries are presented as a table in the corresponding 3GPP technical specifications, but should be interpreted as a logical and rather non-restrictive term. In particular, the present disclosure is not limited to any particular organization, and the TDRA table may be implemented in any manner as a set of parameters associated with the respective entry indices.

For instance, the row of the TDRA table indexed by the DCI defines several parameters that can be used for the allocation of the radio resources in the time domain. In the present example, the TDRA table can indicate the slot offset K0/K2, the start and length indicator SLIV, or directly the start symbol S and the allocation length L. Furthermore, the TDRA table may also indicate the PDSCH mapping type to be assumed in the PDSCH reception and the dmrs-TypeA-Position, parameters that are not directly relating to the scheduled time-domain radio resources. The time-domain allocation field in the DCI is used as an index into this table from which the actual time-domain allocation is then obtained. In such an exemplary implementation, the DCI indication of a row of a TDRA table (one value of the row index) thus corresponds to an indication of a combination of specific values of dmrs-TypeA-Position, PDSCH mapping type, K0 value, S value, and/or L value.

There is at least one table for uplink scheduling grants and one table for downlink scheduling assignments. For example, 16 rows can be configured where each row contains:

- A slot offset (K0, K2), which is the slot relative to the one where the DCI was obtained. At present, downlink slot offsets from 0 to 3 are possible, while for the uplink slot offsets from 0 to 7 can be used. The slot offset can also be termed as a gap (e.g., time gap or slot gap) between the slot of the PDCCH (including the K0/K2) and the slot of the corresponding PDSCH, scheduled by the PDCCH, as a number of slots.
- The first OFDM symbol in the slot where the data is transmitted.
- The duration of the transmission in number of OFDM symbols in the slot. Not all combinations of start and length fit within one slot. Therefore, the start and length are jointly encoded to cover only the valid combinations.
- For the downlink, the PDSCH mapping type, i.e., the DMRS location is also part of the table. This provides more flexibility compared to separately indicating the mapping type.

For instance, a DL slot offset of 1 slot would be indicated in the DCI in slot n, and the scheduled PDSCH is thus transmitted in slot n+1. The starting symbol could be the $4^{th}$ symbol of that slot n+1, and the duration of the scheduled PDSCH could be 4 symbols.

The current 3GPP standard TS :38.214 v16.1.0, for instance section 5.1.2 for DL and section 6.1.2 for UL, relates to the time-domain scheduling and provides several default tables that can be used in said respect, e.g., when no RRC-configured tables (e.g., pdsch-TimeDomainAllocationList in either pdsch-ConfigCommon or pdsch-Config) are available at the UE.

Multi-TTI Scheduling

In Release-16 of 3GPP 5G NR, it is supported that one single DCI schedules multiple repeated PDSCHs or PUSCHs over multiple transmission time intervals (TTIs). In the following, one TTI can be considered to be either a slot or a mini-slot (see, e.g., FIG. 9 and related description above). Furthermore, the transmission of a transport block within a TTI is also called in the following a (single) transmission, for example; conversely the reception of a transport block within a TTI is also called in the following a (single) reception.

Figure 10:
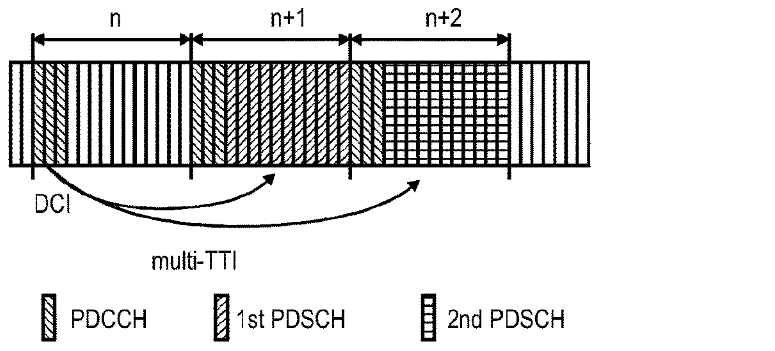
FIG. 10 illustrates an exemplary multi-TTI scheduling, here two PDSCH receptions allocated by a single DCI.

An exemplary multi-TTI scheduling is illustrated in FIG. 10, according to which one DCI at slot n schedules a $1^{st}$ PDSCH at slot n+1 and a $2^{nd}$ PDSCH at slot n+2. Exemplarily, both PDSCHs start at the $3^{rd}$ symbol in the slot and have a length of 12 ODM symbols. The transmission is thus repeated one time at the slot n+2 that is consecutive to the first transmission at slot n+1.

The above multi-TTI scheduling of FIG. 10 is merely an example, and there are other possibilities. For instance, the repetition transmission can start at the same slot n the DCI is received.

In said connection, it is possible for the gNB to configure a specific TDRA table with an additional repetition parameter. In the uplink, for instance, the PUSCH-TimeDomain-ResourceAllocationListNew information element can be configured by the gNB, which is applicable to define the time-domain relation between the PDCCH (DCI) and the PUSCH for DCI formats 0_1/0_2. This information element may contain a parameter numberOfRepetitions-r16, which can be {n1, n2, n4, n7, n12, n16} (see TS 38.331 v16.0.0 section 6.3.2). For instance, n1 could be understood as meaning that only one transmission is performed, effectively disabling the repetition mechanism; n2 could be understood as meaning that two transmissions of the TB are performed in total; etc.

On the other hand, for the downlink, for instance, the information element PDSCH-TimeDomainResourceAllocationList can be used by the gNB to configure a specific TDRA table for a time-domain relation between the PDCCH and the PDSCH. This information element may contain the optional parameter repetitionNumber, which can take values of {n2, n3, n4, n5, n6, n7, n8, n16} (see TS 38.331 v16.0.0 section 6.3.2). For instance, n2 could be understood as meaning that two transmissions of the TB are performed in total; n3 that three transmission of the TB are performed in total, etc.

At present, the 5G NR implementation assumes consecutive transmissions, i.e., repetitions at consecutive TTIs. However, this might change in future versions of the telecommunication standards, such as 5G NR or a successor, such that there could also be the possibility that transmission gaps could occur between each or some of the transmissions. The solutions presented herein also apply to such a repetition transmissions with transmission gaps.

Moreover, as currently defined in 5G NR Release 16, the repetition mechanism repeats the same information data from upper layer (e.g., transport block (TB) from MAC layer) over multiple TTIs (e.g., slots). However, this might change in future versions of the telecommunication standards such as 5G NR or a successor, such that there could also be the possibility that more than one transport block can be transmitted (in the uplink or the downlink) based on a single DCI over multiple TTIs. In addition, each transport block could in turn be repeated (e.g., 4 total transmissions, with 2 transmissions in total per one transport block). The solutions presented herein also apply to such allocations of several transport blocks per DCI.

Consequently, the repetition concept already introduced in 5G NR Release 16 is broadened for the present application. For instance, in the following it is exemplarily assumed that a single DCI transmitted by the gNB can allocate a plurality (i.e., more than one) of transmissions/receptions, which is called in the following a multi-TB scheduling. The multi-TTI scheduling mechanism would thus cover a transmission or reception of one or more TB, in consecutive or inconsecutive TTIs, starting with or without an offset after receiving the DCI.

Further Improvements

The inventors have identified problems in connection with the above.

In particular, the PDCCH monitoring occasions in the time domain are semi-statically configured by the RRC in the search space set configurations. This is done independently and irrespectively of the possible multi-TR scheduling.

Therefore, even if a DCI schedules a multi-TTI transmission or reception, the semi-statically configured PDCCH monitoring occasions are not cancelled, although it may be assumed that the gNB does not transmit (another) PDCCH (DCI) at such occasions. The UE therefore performs the PDCCH monitoring function also at those PDCCH monitoring occasions at which a further PDCCH DCI is very unlikely.

Figure 11:
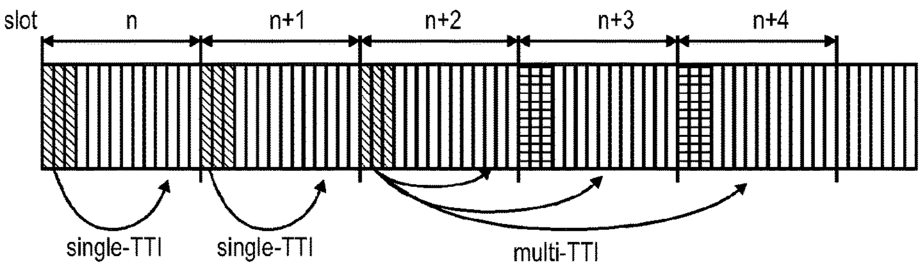
FIG. 11 illustrates a problem in connection with multi-TTI scheduling and PDCCH monitoring.

Such an exemplary scenario is illustrated in FIG. 11, which assumes two subsequent single-TTI allocations and then a multi-TTI allocation at slot n+2 that allocates three transport blocks, specifically at n+2, n+3 and n+4. Nonetheless, the UE monitors the configured PDCCH monitoring occasions at slots n+3 and n+4 (horizontally dashed) (in the respective 3 first OFDM symbols).

The UE will thus consume power unnecessarily by performing the monitoring function at those PDCCH monitoring occasions at slots n+3 and n+4.

The inventors have thus identified the possibility of providing a PDCCH monitoring function that allows avoiding or mitigating the above-identified problems.

Embodiments

In the following, lifts, base stations, and procedures to meet these needs will be described for the new radio access technology envisioned for the 5G mobile communication systems, but which may also be used in LTE mobile communication systems. Different implementations and variants will be explained as well. The following disclosure was facilitated by the discussions and findings as described above and may for example be based at least on part thereof.

In general, it should be noted that many assumptions have been made herein so as to be able to explain the principles underlying the present disclosure in a clear and understandable manner. These assumptions are however to be understood as merely examples made herein for illustration purposes that should not limit the scope of the disclosure. A skilled person will be aware that the principles of the following disclosure and as laid out in the claims can be applied to different scenarios and in ways that are not explicitly described herein.

Moreover, some of the terms of the procedures, entities, layers, etc., used in the following are closely related to LTE/LTE-A systems or to terminology used in the current 3GPP 5G standardization, even though specific terminology to be used in the context of the new radio access technology for the next 3GPP 5G communication systems is not -fully decided yet or might finally change. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology, but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

Communication between the UE and the base station is typically standardized and may be defined by different layers, such as PHY, MAC, RRC, etc., (see above background discussion).

The expressions "transmission or reception" and "transmission/reception" used herein should be understood in that the present concepts apply to a scheduling DCI, irrespective of whether the scheduling DCI schedules a scheduled transmission or a scheduled reception. Similarly, when referring to the number of transmissions or receptions, this should be understood in that the scheduling DCI allocates either a specific number of transmissions to the UE or a specific number of receptions.

The expression "single-TTI scheduling" (and similar expressions) used herein is to be understood as referring to a scheduling DCI that schedules a single transmission or reception of data, e.g., occurring in one TTI.

On the other hand, "multi-TTI" used herein it to be understood as referring to a scheduling DCI that schedules multiple transmissions or receptions of data, e.g., occurring at several TTIs. The multiple transmissions or receptions can either convey the same data in the different transmission/reception occasions (i.e., TTIs), i.e. in the sense of a repetition of data. Alternatively, the multiple transmissions or receptions may convey respectively different data in the different transmission/reception occasions (i.e., TTIs), i.e., thereby increasing the data throughput. Still, alternatively, the multiple transmissions or reception may covey the same data in some of the different transmission/reception occasions and different data in some other of the different transmission/reception occasions.

The expression "search space set" can be broadly understood as a set of search spaces, with a plurality of search spaces, each search space comprising one or a plurality of possible candidates for receiving a DCI message. For instance, a search space groups various candidates with the same aggregation level but with a different format of the DCI message. In turn, for instance, the set of search spaces may then comprise search spaces of different aggregation levels, but being associated with a same set of time-frequency resources to be monitored (e.g., a same CORESET). One particular exemplary implementation is given by the 3GPP 5G NR standards, as explained above. The expressions "search space set" and "search space set groups" are used herein to name the underlying concept, but should not be considered as limitations.

The term "monitoring" can be broadly understood as trying to decode a possible candidate for receiving a DCI message, e.g., based on a particular format. Such a decoding attempt can also be called blind decoding.

Figure 12:
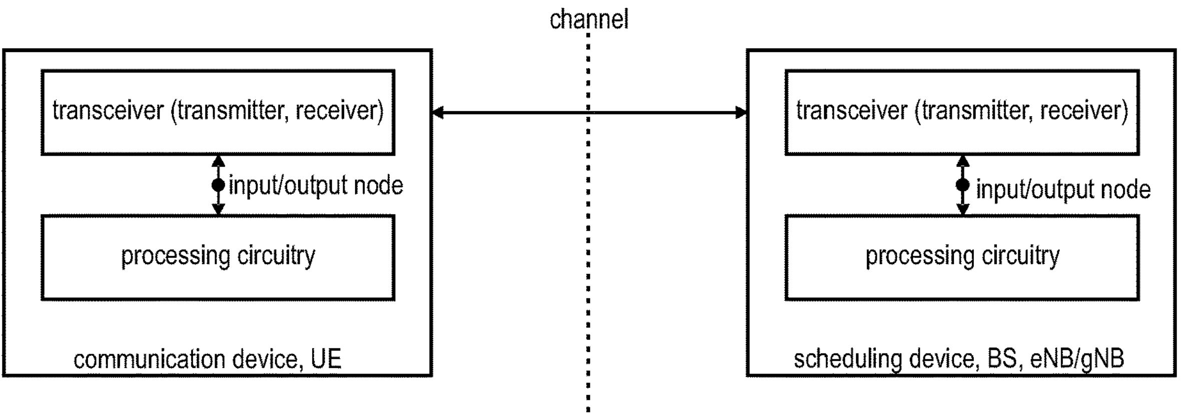
FIG. 12 illustrates an exemplary and simplified structure of a UE and gNB.

FIG. 12 illustrates a general, simplified and exemplary block diagram of a user equipment (also termed communication device) and a scheduling device (here exemplarily assumed to be located in the base station, e.g., the eLTE eNB (alternatively termed ng-eNB) or the gNB in 5G NR). The UE and eNB/gNB are communicating with each other over a (wireless) physical channel respectively using the transceiver.

The communication device may comprise a transceiver and processing circuitry. The transceiver in turn may comprise and/or function as a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, i.e., control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data, which is further processed by the processing circuitry. The processing circuitry may also be responsible for performing other processes such as determining, deciding, calculating, measuring, etc. The transmitter may be responsible for performing the process of transmitting and other processes related thereto. The receiver may be responsible for performing the process of receiving and other processes related (hereto, such as monitoring a channel.

An improved monitoring procedure of a downlink control channel (e.g., the PDCCH) will be described in the following. In said connection, an improved UE and improved base station are presented, which participate in the improved downlink control channel monitoring procedure (exemplarily called in the following also PDCCH monitoring procedure). Corresponding methods for the UE behavior and the base station behavior are provided as well.

Figure 13:
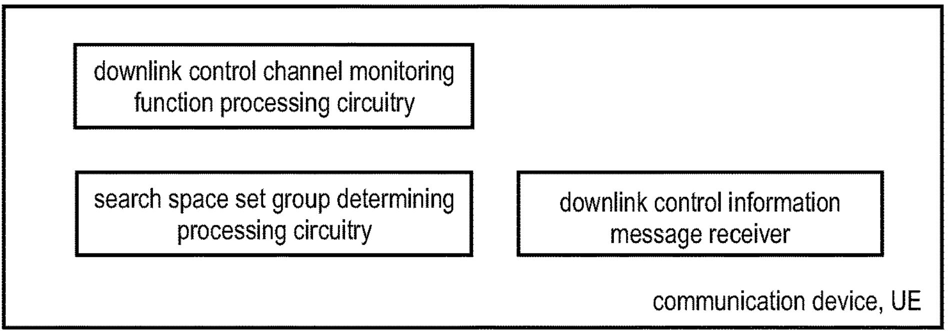
FIG. 13 illustrates a structure of the UE according to an exemplary implementation of an improved PDCCH monitoring procedure.

FIG. 13 illustrates a simplified and exemplary UE structure according to one exemplary solution of the improved PDCCH monitoring procedure, and can be implemented based on the general UE structure explained in connection with FIG. 12. The various structural elements of the UE illustrated in said figure can be interconnected between one another, e.g., with corresponding input/output nodes (not shown), e.g., in order to exchange control and user data and other signals. Although not shown for illustration purposes, the UE may include further structural elements.

As apparent from FIG. 13, the UE may include processing circuitry for a downlink control channel monitoring function, processing circuitry for determining search space set groups, and a receiver for receiving downlink control information messages.

In the present case as will become apparent from the below disclosure, the receiver of the UE can thus be exemplarily configured to at least partly perform one or more of receiving downlink control information messages, of receiving the allocated data and of receiving configuration information.

Furthermore, in the present case as will become apparent from the below disclosure, the processing circuitry (also termed processor) of the UE can thus be exemplarily configured to at least partly perform one or more of performing a monitoring function for the downlink control channel, of determining search space set groups, of determining the content of the downlink control information message, of determining the number of transmissions or receptions allocated by the content of the downlink control information message, of determining the identity of the search space set group, of determining a priority of data of the transmission or reception allocated by the content of the downlink control information message, etc.

Furthermore, in the present case as will become apparent from the below disclosure, the transmitter of the UE can thus be exemplarily configured to at least partly perform one or more of transmitting the allocated data, etc.

One exemplary solution as will be disclosed in more detail further -bellow is implemented by a UE that includes the following. A processor of the UE operates a monitoring function that involves monitoring of a downlink control channel for receiving a downlink control information message based on one of a plurality of groups of search space sets. A receiver of the UE receives a downlink control information message via the monitored downlink control channel, wherein the received downlink control information message allocates transmission or reception of data to the UE. The processor further determines one group of the plurality of groups of search space sets for performing the monitoring function of the downlink control channel. The determining of the one group of search space sets is based on:

the content or the format of the received downlink control information message.

Figure 14:
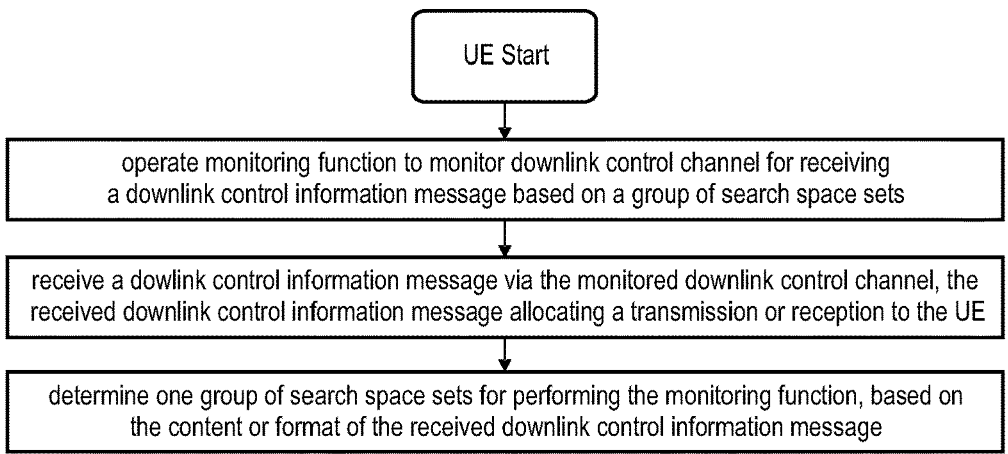
FIG. 14 is a flow diagram for the UE behavior, according to an exemplary implementation of the improved PDCCH monitoring procedure.

A corresponding sequence diagram for an exemplary UE behavior in line with the above-discussed UE is illustrated in FIG. 14. The UE operates a monitoring function that involves monitoring of a downlink control channel for receiving a downlink control information message based on one of a plurality of groups of search space sets. The UE receives a downlink control information message via the monitored downlink control channel, wherein the received downlink control information message allocates transmission or reception of data to the UE. The UE determines one group of the plurality of groups of search space sets for performing the monitoring function of the downlink control channel, wherein determining the one group of search space sets is based on:

the content or the format of the received downlink control information message.

According to this improved PDCCH monitoring procedure, the UE is enabled to adapt the PDCCH monitoring function in accordance with the allocation performed by the downlink control information (DCI) message, by suitably determining a different, more suitable, search space set (SSS) group for performing the monitoring function. For instance, the periodicity of the required monitoring occasions of the downlink control channel of the new SSS group might be changed depending on how the UE is scheduled by the base station in the received DCI message. In brief, the monitoring requirements imposed on the UE can be made to match the scheduling intention or need by the base station.

Figures 15, 16, 17:
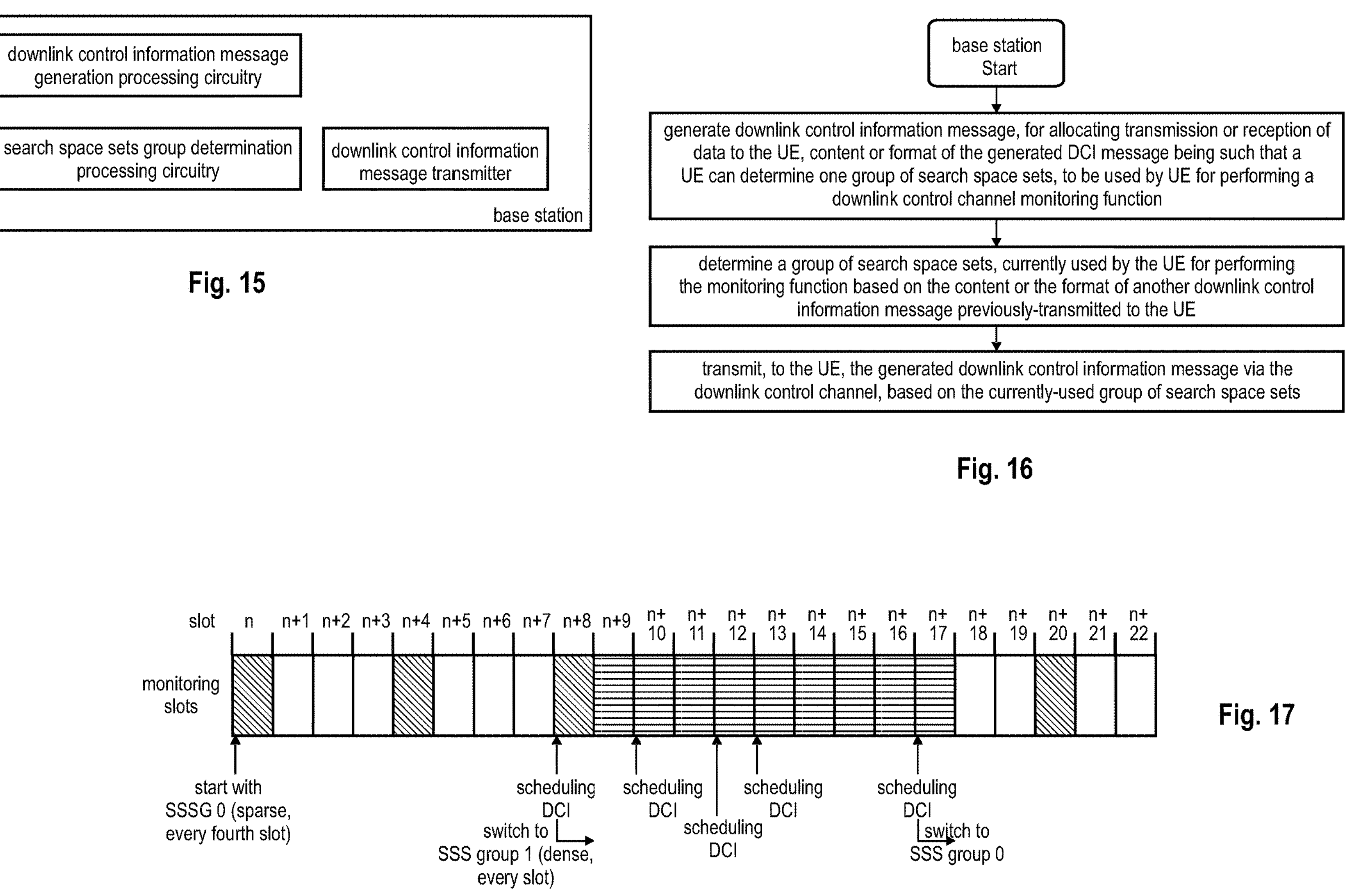
FIG. 15 illustrates a structure of the base station according to an exemplary implementation of the improved PDCCH monitoring procedure.
FIG. 16 is a flow diagram for the base station behavior, according to an exemplary implementation of the improved PDCCH monitoring procedure.
FIG. 17 illustrates the switching between different groups of search space sets, according to the improved PDCCH monitoring procedure.

As already apparent from above, the improved downlink control channel monitoring procedure also provides an improved radio base station. FIG. 15 illustrates a simplified and exemplary base station structure according to one exemplary solution of the improved downlink control channel monitoring procedure, and can be implemented based on the general base station structure explained in connection with FIG. 12. The various structural elements of the radio base station illustrated in said FIG. 15 can be interconnected between one another, e.g., with corresponding input/output nodes (not shown), e.g., in order to exchange control and user data and other signals. Although not shown for illustration purposes, the base station may include further structural elements.

As apparent from FIG. 15, the base station may include processing circuitry for generating downlink control information messages, processing circuitry for determining groups of search space sets, and a transmitter for transmitting downlink control information messages.

In the present case as will become apparent from the below disclosure, the processing circuitry of the base station can thus be exemplarily configured to at least partly perform one or more of generating downlink control information messages, including setting the content and format of the messages as well as determining a group of search space sets, determining the number of transmissions or receptions allocated by the BS in a previously-transmitted downlink control information message, operating timers, such as a prohibition timer and a switching tinier, etc.

In the present case as will become apparent from the below disclosure, the transmitter of the base station can thus be exemplarily configured to at least partly perform one or more of transmitting downlink control information messages, and transmitting configuration messages to the UE, etc.

In the present case as will become apparent from the below disclosure, the receiver of the base station can thus be exemplarily configured to at least partly perform one or more of receiving a transmission of data from the UE.

One exemplary solution as will be disclosed in more detail further below is implemented by a radio base station that includes the following. A processor of the BS generates a downlink control information message, wherein the generated downlink control information message allocates transmission or reception of data to the UE. Further, the content or the format of the generated downlink control information message is such that a user equipment is able to determine one group of a plurality of groups of search space sets. This determined group of search space sets is to be used by the user equipment for performing a monitoring function that involves monitoring of a downlink control channel for receiving a downlink control information message. The processor of the BS determines a group of the plurality of groups of search space sets, currently being used by the user equipment for performing the monitoring function. The determining of the currently-used group of search space sets is based on the content or format of another downlink control information message previously transmitted to the user equipment. A transmitter of the BS transmits the generated downlink control information message via the downlink control channel to the user equipment, based on the determined currently-used group of search space sets.

A corresponding sequence diagram for an exemplary base station behavior in line with the above-discussed base station is illustrated in FIG. 16. According to this improved base station behavior, the base station generates a downlink control information message, wherein the generated downlink control information message allocates transmission or reception of data to the UE. The content or the format, of the generated downlink control information message is such that a user equipment is able to determine one group of a plurality of groups of search space sets, to be used by the user equipment for performing a monitoring function that involves monitoring of a downlink control channel for receiving a downlink control information message. The base station determines a group of the plurality of groups of search space sets, currently being used by the user equipment for performing the monitoring function. The determining of the currently-used group of search space sets is based on the content or format of another downlink control information message previously transmitted to the user equipment. The base station then transmits the generated downlink control information message via the downlink control channel to the user equipment, based on the determined currently-used group of search space sets.

Correspondingly, the improved base station is able to exert some control over how the UE performs the PDCCH monitoring procedure, based on the scheduling DCIs transmitted from the BS to the UE. The scheduling DCI is not only provided to the UE to allocate radio resources for a downlink reception of data or uplink transmission of data, but is used for controlling which SSS group the UE is to use for performing the downlink control channel monitoring function.

The improved downlink control channel monitoring procedure is exemplarily illustrated in FIG. 17, which shows for a sequence of slots how the UE (and base station) switch the group of search space sets (SSS) depending on the reception of the scheduling DCI. It is assumed that the UE starts the monitoring function based on the SSSG 0, which is assumed to provide a periodicity of the monitoring occasions only every fourth slot (at n, n+4, n+8, n+12, etc.; considered to be a sparse SSSG, especially compared to SSSG 1). The SSSG 1 on the other hand can be considered to provide comparatively dense required monitoring occasions, particularly at every slot.

It is further assumed that the base station is aware of the monitoring occasions of the UE, and thus uses the monitoring occasion at slot n+8 for scheduling the UE (see "scheduling DCI" in FIG. 17), e.g., for a downlink or uplink transmission. In this particular example, the scheduling DCI causes the UE to switch to the SSS group 1 and thus to monitor the downlink control channel at every slot. Correspondingly, the content or format of that scheduling DCI is set by the gNB such that it causes the UE to switch to another SSS group. This allows the base station to schedule the UE more often, e.g., as apparent from FIG. 17 at slots n+10, n+12 and n+13. The UE keeps monitoring the downlink control channel at every slot until slot n+17, in which the base station provides another scheduling DCI, which this time causes the UE to again switch hack to the SSS group 0 as of slot n+18 (with the sparser monitoring occasions). The first monitoring occasion according to SSSS group 0 occurs, after the switch, at n+20.

Therefore, by providing an SSSG with sparse monitoring requirements, the UE is allowed to skip certain slots for the monitoring function, such that there is no need to waste power in said respect (e.g., by not having to perform blind-decoding on those downlink control channel monitoring occasions).

According to one exemplary implementation, the sparse SSSG is to be used by the UE when it is unlikely or not reasonable that the base station schedules the UE. For instance, this might be the case where the scheduling DCI schedules a multi-TTI transmission or reception, which spans several slots (see also corresponding more detailed solutions below). Another example is a scenario in which the UE is scheduled with delay-tolerant traffic (e.g., of low priority), where power saving opportunities for the UE could be considered more important than the scheduling flexibility of the base station (scheduling flexibility being typically more important for, e.g., delay-intolerant, e.g., high-priority, traffic; see corresponding more detailed solutions below).

Overall, the monitoring requirements of the UE can be adapted to the scheduling requirements of the base station. For instance, when a multi-TTI transmission/reception is scheduled, the monitoring effort at the UE as well as the resulting power consumption are reduced, while the traffic demand can still be accommodated. This can be beneficial if, e.g., the channel conditions are stable across multiple TTIs.

On the other hand, when switching to single-TTI scheduling, the PDCCH monitoring effort is increased so as to allow for a better scheduling flexibility. This could be beneficial if, e.g., the channel conditions become more dynamic and it is difficult for the base station to take a good scheduling decision across multiple TTIs. Particularly, the base station has to consider unpredictable traffic dynamics for high-priority UEs, so that the base station cannot reserve radio resources in advance for multiple TTIs.

The scheduling DCI mentioned above allocates the transmission/reception of data to the UE. For instance, the downlink control information message allocates downlink radio resources for the reception of data by the UE. In exemplary 5G NR implementations, the downlink control information message can of a format 1_0 or 1_1 or 1_2. On the other hand, the downlink control information message allocates uplink radio resources for the transmission of data by the UE. The downlink control information message is of a format 0_0 or 0_1 or 0_2.

Although not illustrated in the above figures because it is of minor relevance, the UE also proceeds to perform, e.g., the transmission or reception of data, in accordance with the scheduling provided by the single scheduling DCI. For instance, the UE performs a single transmission of data (in case of single-TTI uplink scheduling) or multiple transmissions of data (in case of multi-TTI uplink scheduling). Or, the UE performs a single reception of data (in case of single-TTI downlink scheduling) or multiple receptions of data (in case of multi-TTI downlink scheduling).

In the above exemplary illustration of FIG. 17 (and also in subsequent illustrations and explanations), several assumptions have been made for ease of illustration and explanation, which however should not be understood as limiting the scope of the invention.

For instance, one such exemplary assumption is that the switching of the SSSG occurs at the slot boundary of the slot (e.g., slot n+1) that is next to the slot where the scheduling DCI is received that causes the switch (e.g., slot n). However, this is merely an example, and the switching may also occur at a different timing, such as at a later slot boundary (n+x), or at the earliest slot boundary that is after the scheduling DCI by considering a minimum time gap of x symbols (the value x is a positive integer value could be configured or defined by a suitable 3GPP standard). In addition, the value x could also depend on the UE capability, e.g., such that high-end. UEs can support a faster processing based on a lower n-value, and low-end UEs are allowed more processing time based on a larger n-value.

Another exemplary assumption is that the two (or more) SSS groups differ between each other regarding a periodicity of the monitoring occasions the UE is required to monitor the downlink control channel for receiving a DCI message. For instance, SSSG 0 has a long monitoring periodicity (long, compared to SSSG 1; here, the long periodicity is 4 slots), and the SSSG 1 has a short periodicity (short, compared to SSSG 0; here, the short periodicity is 1 slot). Put differently, a dense SSSG provides a lot of monitoring occasions in the time domain (or per time-domain unit), more than a sparse SSSG that provides only a few monitoring occasions in the time domain (or per time-domain unit).

However, in addition or alternatively, the various SSS groups may also differ in a different manner, e.g., in terms of number of PDCCH candidates. For instance, SSSG 0 contains a smaller number of PDCCH candidates than SSSG 1. Consequently, by monitoring SSSG 0, UE can achieve power saving gain with some (controllable) degree of sacrificing the scheduling flexibility.

In addition or alternatively, various SSSGs may also differ in the DCI formats For example, SSSG 0 can be configured to contain only DCI formats 0-0 and 1-0 (also called fall-back formats in the sense that they are compact (smaller in size) and hence have less scheduling flexibility), whereas SSSG 1 contains other DCI formats. The advantage of such configuration includes that, once UE monitors SSSG 0, the blind decoding effort is reduced, and therefore, UE power saving is achieved.

Further in addition or alternatively, different PDCCH monitoring patterns within a slot can be configured for different SSSGs respectively. For instance, SSSG 0 can be configured to be present at the first 2 symbols of a slot, whereas SSSG 1 can be configured to be present at the $7^{th}$ and $8^{th}$ symbols of a slot. With such configuration, SSSG 0 will facilitate same-slot scheduling more than SSSG 1. This is due to the fact that one PDSCH or one PUSCH transmission cannot span across the slot boundary. Therefore, by providing scheduling opportunity at the beginning of a slot, such as SSSG 0, allows more time for UE to process the data if the data is scheduled in the same slot. By contrast, SSSG1 can be used for cross-slot scheduling, e.g., DCI in slot n schedules data in slot n+1.

Another exemplary assumption made for ease of illustration and explanation is that the UE is configured with only two different groups of search space sets. However, the concepts described herein also apply to lips with more than two different groups of SSS.

Another exemplary assumption is that one of the SSS groups is a default SSS group, e.g., the one SSS group that the UE initially uses for performing the monitoring function. For instance, the initial or default SSS group can be defined to provide a high number of monitoring occasions per time, so as to increase the scheduling flexibility of the base station and thus possibly reduce the scheduling delay. On the other hand, the initial or default SSS group can be defined to provide a low number of monitoring occasions per time, so as to increase the possibility of the UE to skip slots of PDCCH monitoring to save power.

Another exemplary assumption is that the improved downlink control channel monitoring function (e.g., including the SSS group switching, and also the time unit at which the UE can be scheduled by the BS) is performed on a slot basis (i.e., 14 OFDM symbols for normal cyclic prefix; 12 OFDM symbols for extended cyclic prefix). However, the improved function also can be performed on a mini-slot basis, where the mini-slot spans one or a plurality of OFDM symbols, but less than a complete time slot (i.e., <14 OFDM symbols for normal cyclic prefix; <12 OFDM symbols for extended cyclic prefix). For instance, the monitoring function would be performed every mini-slot, e.g., every two OFDM symbols. The mini-slot thus constitutes the TTI at which the UE can be scheduled.

Although not explicitly mentioned, another exemplary assumption is that the UE is scheduled to receive or transmit the same data in the multi-TTI scheduling. However, this is not to be considered a limitation of the improved procedure. Rather, the improved. PDCCH monitoring procedure is also applicable to cases where several transport blocks can be scheduled by a single DCI. Put differently, the multi-TTI scheduling does not refer just to the same single transport block (that is thus effectively repeated) but to more than one transport block (each of which then could possibly also be repeated within the same multi-TTI scheduling).

The improved PDCCH monitoring procedure as explained above also involves the base station, which is responsible for transmitting the scheduling DCIs to the UE. For instance, the base station performs steps that correspond to those at the UE-side, so as to allow the base station to determine how the UE monitors the PDCCH. This is beneficial for the base station, because it can transmit the scheduling DCIS at a time slot (and OFDM symbol) at which the UE indeed monitors the downlink control channel. For instance, the base station could perform the same determinations for determining the SSS group as the UE. The basic base station behavior is illustrated in FIG. 16.

There are several possibilities on how the UE determines the SSSG it should use for the monitoring function based on the scheduling DCI, e.g., based on the content or format of the scheduling DCI. A brief overview is given over these solutions, each of which will be explained subsequently in more detail.

A first solution distinguishes between scheduling DCIs that schedule a single transmission or reception (single-TTI scheduling) and scheduling DCIs that schedule multiple transmissions or receptions (multi-TTI scheduling). A variant of the first solution incorporates the use of a prohibition time period that ensures that the switching applies to a minimum amount of time.

A second solution provides a more explicit indication of the SSS group that the UE is to use for the monitoring function, e.g., by including a field in the scheduling DCI that allows the UE to directly identify that SSS group. A variant of this second solution incorporates a further switching mechanism that is based on a switching time period, so as to switch back to another SSS group after expiry of said switching period of time.

A third solution is based on the priority of the data that is scheduled by the DCI.

First Solution—Implicit Indication of SSS Group Based on Single-TTI vs Multi-TTI Scheduling DCI A first solution (and variants thereof) is presented in the following on how the UE determines the SSSG it should use for the PDCCH monitoring function based on the scheduling DCI. This first solution revolves around the idea of distinguishing between scheduling DCIs that schedule a single transmission or reception (single-TTI scheduling) and scheduling DCIs that schedule multiple transmissions or receptions (multi-TTI scheduling).

According to one exemplary implementation, the scheduling DCI indicates the number of allocated transmissions or receptions allocated by the base station to the UE. It may thus allow the UE to distinguish between a single-TTI scheduling and a multi-TTI scheduling and, on that basis, to suitably determine the SSSG according to which the PDCCH monitoring function should be operated by the UE.

In an exemplary 5G-NR-standard-based implementation, a specific TDRA table is configured at the UE, the specific TDRA table having a parameter that indicates the number of transmissions or receptions. Correspondingly, the scheduling DCI identifies one set of parameters (e.g., a row) of the TDRA table and thus also whether the allocation refers to a single transmission/reception or multiple transmissions/receptions.

In one exemplary implementation, the parameter in the TDRA table can be the repetition parameter that is already standardized and was explained above ("repetitionNumber" for PDSCH; "numberOfRepetitions" for PUSCH). In this case, the multi-TTI transmission would refer to a repetition of the same data (e.g., same transport block) at different TTIs.

The TDRA table above can be, e.g., fixed by a 5G standard or may be configured by the gNB.

Figure 18:
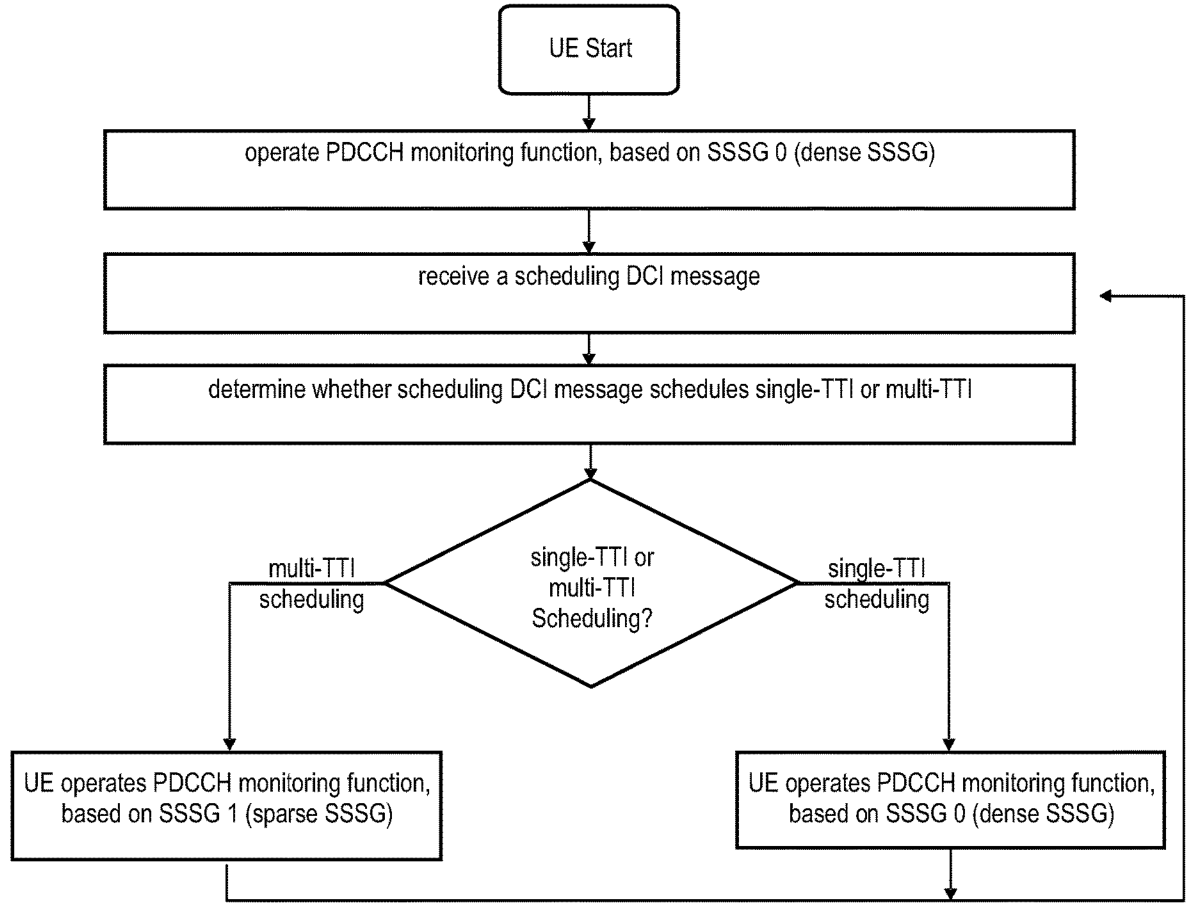
FIG. 18 is a flow diagram for the UE behavior, according to a first solution of the improved PDCCH monitoring procedure.

A flow diagram for the UE-behavior according to one simplified and exemplary implementation of the first solution is presented in FIG. 18. As apparent therefrom, it is assumed that there are only two different SSSG available for the switching; the initial SSSG 0 with a dense PDCCH monitoring pattern, and SSSG 1 with a sparse PDCCH monitoring pattern. The UE is thus assume to operate the monitoring function first based on SSSG 0, which allows the UE to eventually receive a scheduling DCI message from the base station. In line with the first solution, the UE determines whether the scheduling DCI message schedules a single-TTI or a multi-TTI transmission. In case the UE is scheduled for a single-TTI transmission, the UE is to monitor the PDCCH more often and thus follows the monitoring occasions according to SSSG 0. On the other hand, in case the UE is scheduled for a multi-TTI transmission, the UE is allowed to relax the monitoring of the PDCCH because further scheduling DCIs are less likely and not necessary to be transmitted so often; the UE thus follows the monitoring occasions according to the other SSS group 1.

Although not mentioned above, when the UE switches to another SSSG for performing the monitoring function, this implicitly involves that the UE stops following the monitoring occasions according to the previous SSSG.

This discussed process can then be repeated by the UE so as to keep adapting its PDCCH monitoring to the scheduling (e.g., received scheduling DCI).

Figures 19, 20:
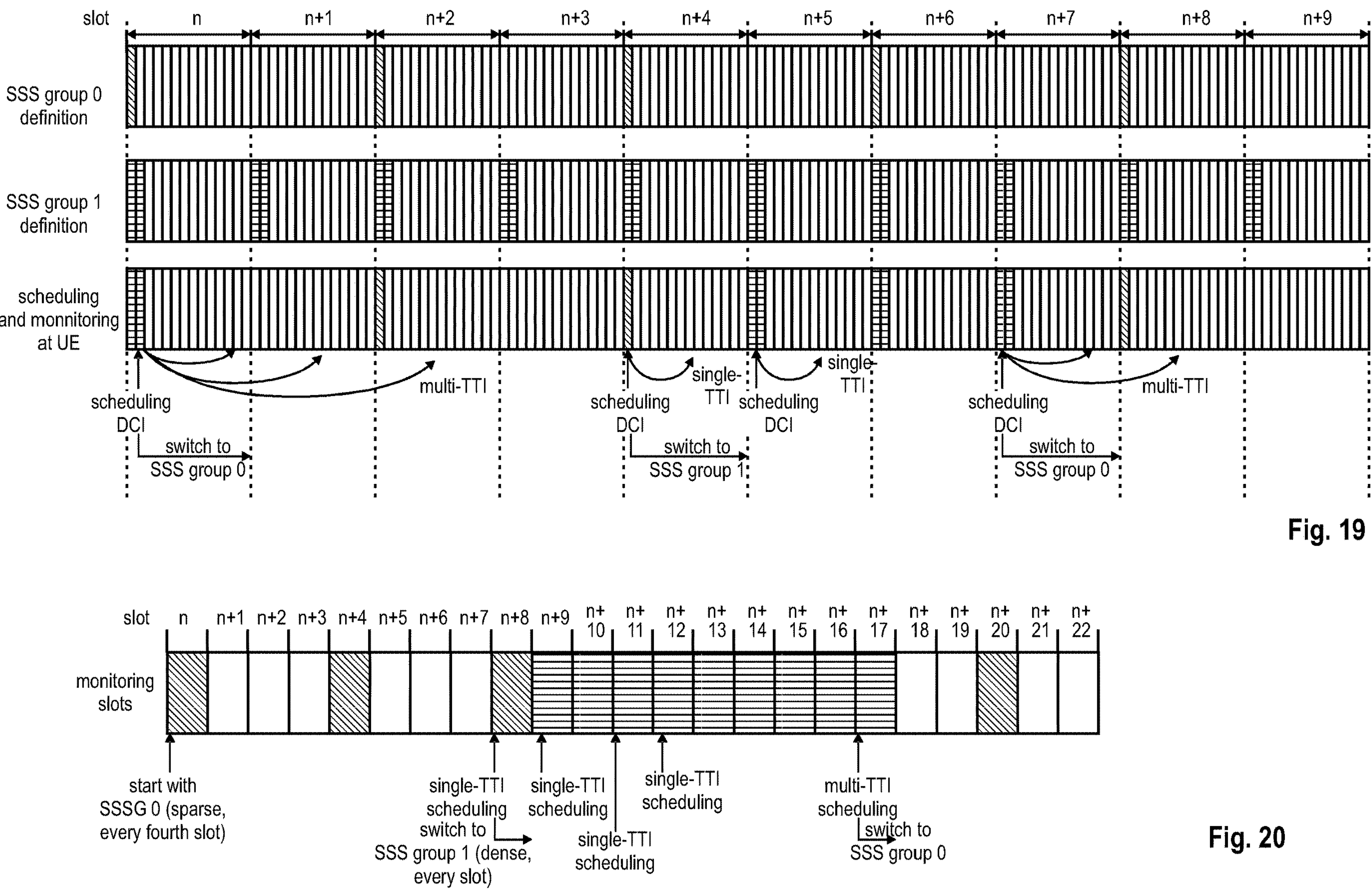
FIGS. 19 and 20 are illustrations showing the switching between different groups of search space sets, according to the first solution of the improved PDCCH monitoring procedure.

The resulting switching between the two SSSGs for performing the PDCCH monitoring function is illustrated in FIGS. 19 and 20. FIG. 19 is a detailed time slot diagram, illustrating the PDCCH monitoring occasions of both SSS groups 0 and 1, wherein SSS group 0 requires to monitor the PDCCH every second time slot for one OFDM symbol, and SSS group 1 requires to monitor the PDCCH every time slot for two OFDM symbols. The third row of FIG. 19 shows the actual scheduling and monitoring performed by the UE, which depends on the scheduling DCIs received by the UE as discussed above for example in connection with FIG. 18.

In this particular exemplary scenario, it is assumed that the UE is already operating its monitoring function, and in time slot n, monitors the PDCCH according to SSSG 1 (see slot n in third row of FIG. 19), i.e., during the first two OFDM symbols. The UE receives a scheduling DCI from the base station at time slot n, which schedules multiple transmissions/receptions of the same or different data. The UE thus determines to switch to SSSG 0, so as to allow to skip the PDCCH monitoring every second time slot. In this case, the UE switches to the SSSG 0 configuration at the slot boundary between time slots n and n+1, where time slot n+1 has no configured monitoring occasions according to SSSG 0.

The base station takes the PDCCH monitoring occasion that the UE follows at time slot n+4 in order to provide single-TTI scheduling DCI to the UE. The UE accordingly switches to SSSG 1, and starts monitoring at time slot n+5 the PDCCH according to the PDCCH monitoring occasions defined by the SSSG 1. This increases the scheduling flexibility, because scheduling opportunities for the base station are available at each time slot. Another single-TTI is scheduled by a scheduling DCI at time slot n+5, and the UE continues performing the monitoring function according to SSSG 1, up to time slot n+7. At time slot n+7, the UE receives a multi-TTI scheduling DCI, which causes the UE to switch again back to SSSG 0 at the next slot boundary to time slot n+8.

FIG. 20 is another time slot diagram similar but simplified compared to FIG. 19. It is again assumed that two different SSS groups are defined, SSSG with a sparse monitoring occasions at every fourth time slot (n, n+4, n+8, etc.), and SSSG1 with relatively dense monitoring occasions occurring at every time slot. As apparent therefrom, the switching is triggered by the reception of the single-TTI or multi-TTI scheduling. In this case, the single-TTI scheduling DCI at time slot n+8, transmitted by the base station, causes the UE to switch to the dense SSSG 1 as of time slot n+9. The greater scheduling flexibility is used by the base station to schedule further single-TTI transmissions/receptions at time slots n+9, n+11 and n+12. The UE, when receiving a multi-TTI scheduling DCI at time slot n+17, switches again to monitoring the PDCCH based on SSSG 0 as of the next time slot n+18. The next monitoring occasion according to SSSG 0 is at time slot n+20, thus allowing the UE to skip monitoring the PDCCH at time slots n+18 and n+19 (also at n+21 and n+22).

In the above exemplary implementations of the first solutions, it was hypothetically assumed that the UE is configured with only two different SSSGs for performing the improved PDCCH monitoring procedure. In case there are more than two SSSGs, the UE needs to further somehow select between the various SSSGs. This can be done, e.g., by comparing the number of scheduled transmissions of the scheduling Del and the periodicity of the required monitoring occasions of the different SSSGs, and then selecting that SSSG with a periodicity of the required monitoring occasions that best corresponds to the number of scheduled transmissions/receptions.

For instance, a scenario can be assumed where three SSS groups are defined, SSSG 0 with a monitoring periodicity of 4 slots (see SSSG 0 of FIG. 20), SSSG 1 with a monitoring periodicity of 2 slots (see SSSG 0 of FIG. 19), and SSSG 2 with a monitoring periodicity of l slot (see, e.g., SSSG 1 of FIG. 19 or 20). When the scheduling DCI allocates in slot n a multi-TTI transmission over four time slots (n to n+3) (or more than four time slots), the UE may determine SSSG 0 which has a corresponding monitoring periodicity of 4 time slots. When the scheduling DCI schedules a multi-TTI transmission over three time slots, the UE may determine SSSG 1 with a corresponding monitoring periodicity of 2 time slot (thereby having an increased scheduling flexibility, but at the expense of decreased power saving possibilities) or may determine SSSG 0 with a corresponding monitoring periodicity of 4 time slots (thereby having a reduced scheduling flexibility, but benefiting from increased power saving possibilities). When the scheduling DCI allocates in slot n a multi-TTI transmission over two time slots (n and n+1), the UE may determine SSSG 1 which has a corresponding monitoring periodicity, of 2 time slots.

A variant of the first solution incorporates the use of a prohibition time period that ensures that the changed. SSSG is applied by the UE for a minimum amount of time, before it is possible to switch to another SSSG (or to the previous SSSG). Put differently, during this prohibition time period after switching to a different SSSG, the UE will not perform another change of SSSG, even if a scheduling DCI is received by the UE that would cause such a change of SSSG. Thus, the UE is prohibited from determining a group of search space sets that is different from a currently-used SSS group for a period of time (after having determined the currently-used SSS group).

Figure 21:
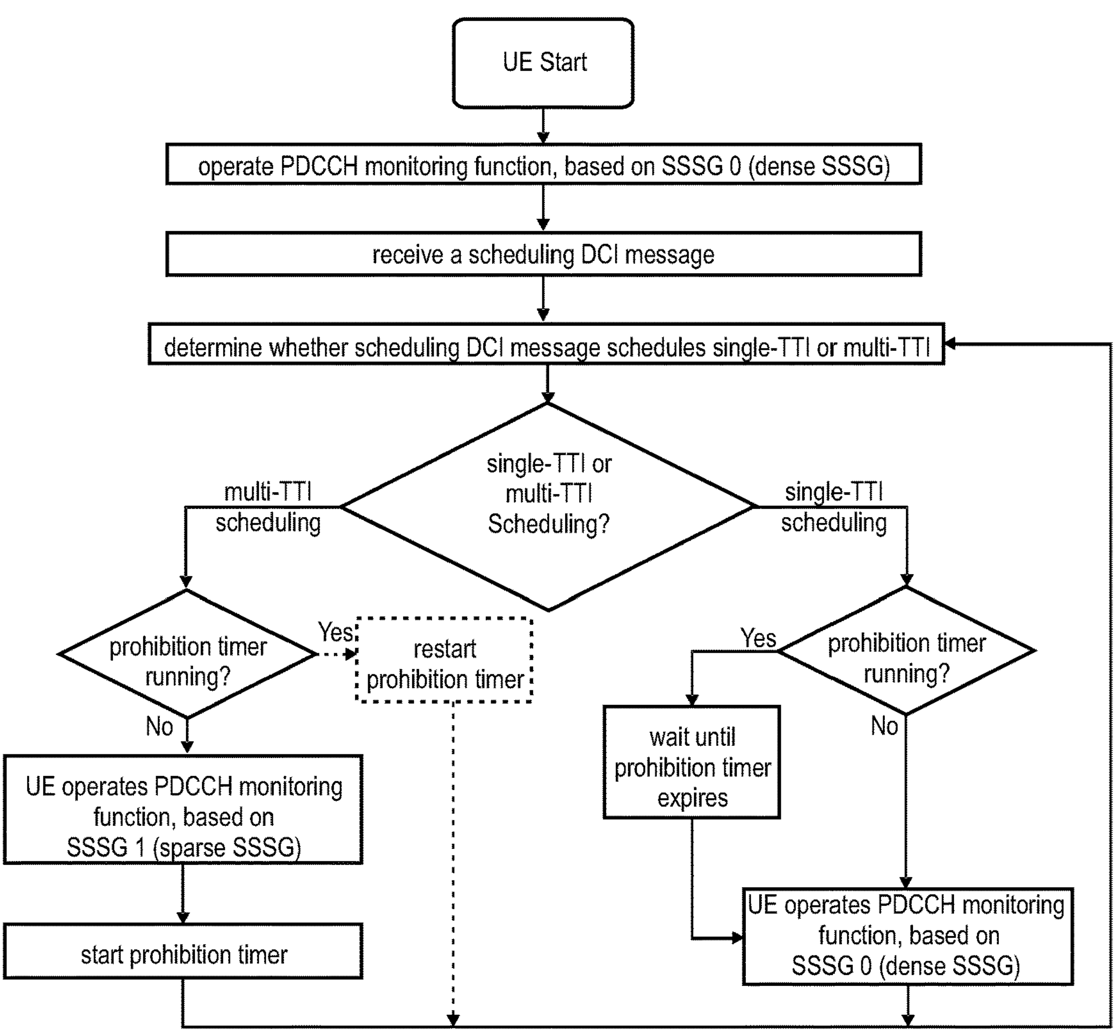
FIG. 21 is a flow diagram for the UE behavior, according to a variant of the first solution of the improved PDCCH monitoring procedure.

The prohibition time period can be applied to just one or some out of all the SSSGs or may be applied to all SSSGs. For instance, when applying the prohibition time period when having changed to a SSSG with sparse monitoring occasions, more power saving can be ensured, because the sparse monitoring occasions are followed by the UE for a minimum amount of time. Conversely, when applying the prohibition time period when having changed to a SSSG with dense monitoring occasions, more scheduling flexibility can be ensured In one exemplary implementation, the prohibition time period can be implemented based on a prohibition timer operated by the UE. This is exemplarily illustrated in the flow diagram for the UE behavior in FIG. 21. FIG. 21 is similar to FIG. 18 in that the UE determines which SSS group to use based on whether the received scheduling DCI allocates a single-TTI transmission/reception or multi-TTI transmissions/receptions). In addition to the steps of FIG.

18, FIG. 21 incorporates steps relating to the operation of the prohibition timer in both branches (i.e., multi-TTI and single-TTI branches).

In particular, it is exemplarily assumed that the prohibition timer is only applied when switching from the sparse SSSG 1 back to the dense SSSG 0 (but not the other way round). Correspondingly, the prohibition timer is started when switching to the multi-TTI related SSSG 1 and runs for a particular period of time (e.g., the prohibition time period, mentioned above). As apparent from FIG. 21, when the UE is scheduled with a single-TTI transmission/reception, the UE additionally determines whether or not the prohibition timer is running or not (expired). The UE may switch to the single-TTI related SSSG 0 when the prohibition timer is not running, or if running, after waiting that the prohibition timer has expired.

In an optional implementation (illustrated in FIG. 21 in dashed lines), the prohibition timer is restarted when already running and when the UE is again determining a multi-TTI scheduling DCI. The prohibition time period is thus extended every time a multi-TTI scheduling DCI is received.

Figure 22:
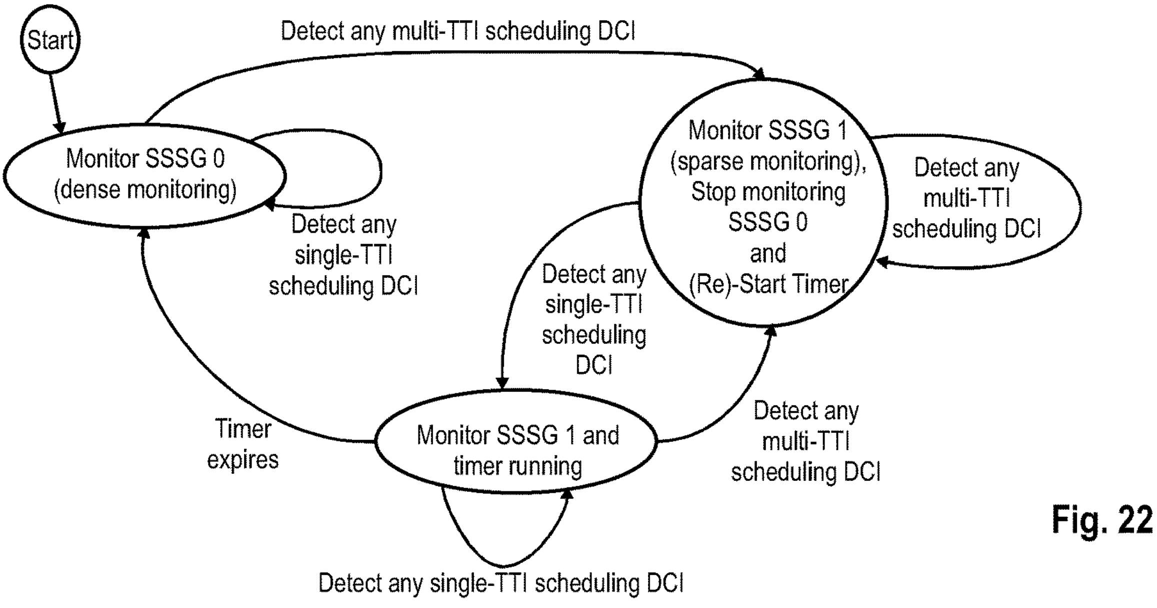
FIGS. 22 and 23 are state change diagrams for the UE, according to the first solution of the improved PDCCH monitoring procedure.

FIG. 22 is a state diagram according to an exemplary implementation of the above first, timer-based, solution, and illustrates a solution that is similar to the solution of FIG. 21. In the state diagram of FIG. 22, it is assumed that the UE starts the PDCCH monitoring function based on SSSG 0 that has dense monitoring occasions, such that by default a higher scheduling flexibility is possible. Correspondingly, the UE switches from SSSG 0 to SSSG 1 based on a multi-TTI scheduling DCI, but continues based on SSSG 0, when detecting a single-TTI scheduling DCI. As also assumed in FIG. 21, in the exemplary implementation of FIG. 22 the prohibition timer is only applied to the switching from SSSG 1 to SSSG 0, therefore avoiding that the UE directly switches back to SSSG 0 even when it receives a single-TTI scheduling DCI.

Furthermore, there is the possibility that the UE after having received a single-TTI scheduling DCI and waiting for the prohibition timer to expire, the already-initiated switch to SSSG 0 is aborted, namely when again receiving a multi-TTI scheduling DCI. In such case, the ping-pong effect (switching back and forth) is avoided by the prohibition timer.

Figure 23:
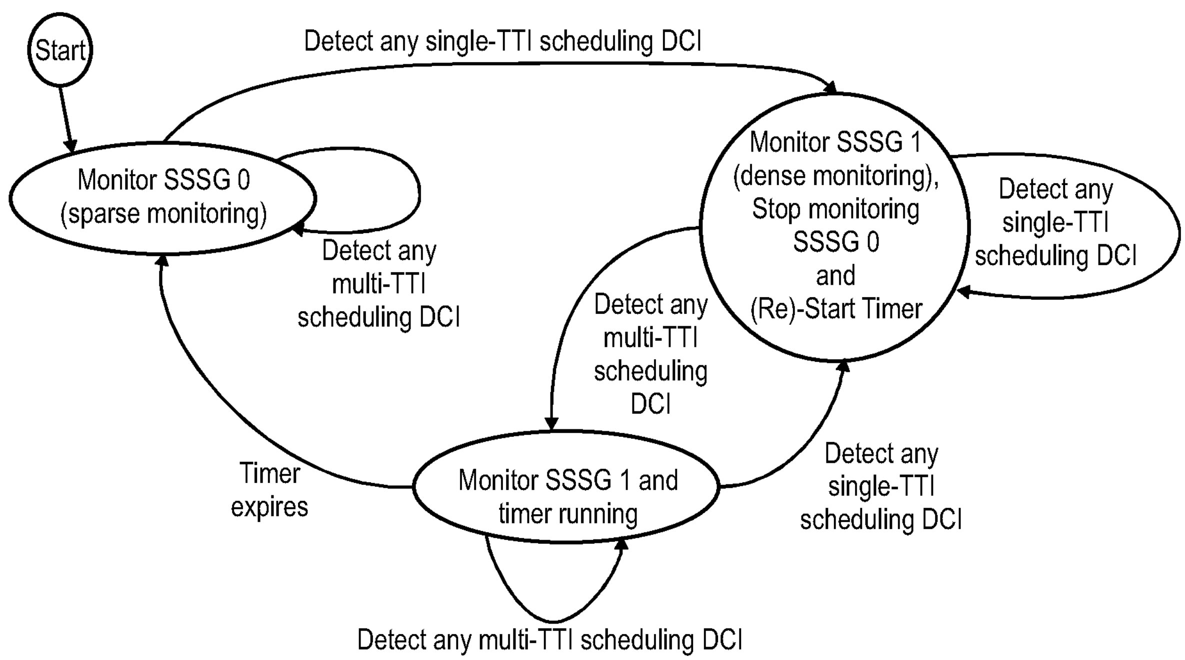

FIG. 23 is another state diagram according to another exemplary implementation of the above first, timer-based, solution. It mainly differs from the one of FIG. 22 in that the SSSG 0 is a sparse monitoring scheme, SSSG 1 is a dense monitoring scheme, such that the UE starts the PDCCH monitoring function based on a sparse monitoring scheme which, by default, allows for more power saving at the UE. Accordingly, the switching from SSSG 0 to SSSG 1 is conversely based on detecting a single-TTI scheduling Del, and vice versa. Further, the prohibition timer is applied to the switching from the dense to the sparse monitoring, thereby ensuring a minimum amount of time with a better scheduling flexibility.

The above first solution (and its variant) can also be implemented at the base station. As already mentioned generally above, the base station performs steps that correspond to those at the UE-side, so as to allow the base station to determine how the UE monitors the PDCCH and then be able to perform according (e.g., transmit the next scheduling DCIs). In the present first solution, the base station thus determines the currently-used SSS group at the UE based on the number of transmissions/receptions allocated to the UE by the content of the previously-transmitted scheduling DCI.

Additionally, for the above prohibition-time-period based solution, the base station also takes into account such a prohibition time period to properly determine the UE behavior and thus which SSS group the UE is currently using for the PDCCH monitoring function.

Correspondingly, the base station is synchronized with the UE, as to which SSS group is currently being used by the UE, and thus which monitoring occasions at the UE could be used for transmitting a scheduling DCI, which the UE is able to receive.

Second Solution—Explicit Indication of SSS Group

A second solution (and variants thereof) is presented in the following on how the UE determines the SSSG it should use for the PDCCH monitoring function based on the scheduling DCI.

According to this second solution, an explicit indication of the SSS group that the UE is to use for the monitoring function is provided by the scheduling DCI, e.g., by including a field in the scheduling DCI that allows the UE to directly identify that SSS group. Correspondingly, the UE determines the identity of the SSS group to be used by the UE for the PDCCH monitoring based on the field that is part of the content of the scheduling DCI.

By using the explicit indication of the SSS group, the base station has more flexibility to control the SSSG that the UE shall monitor.

Figure 24:
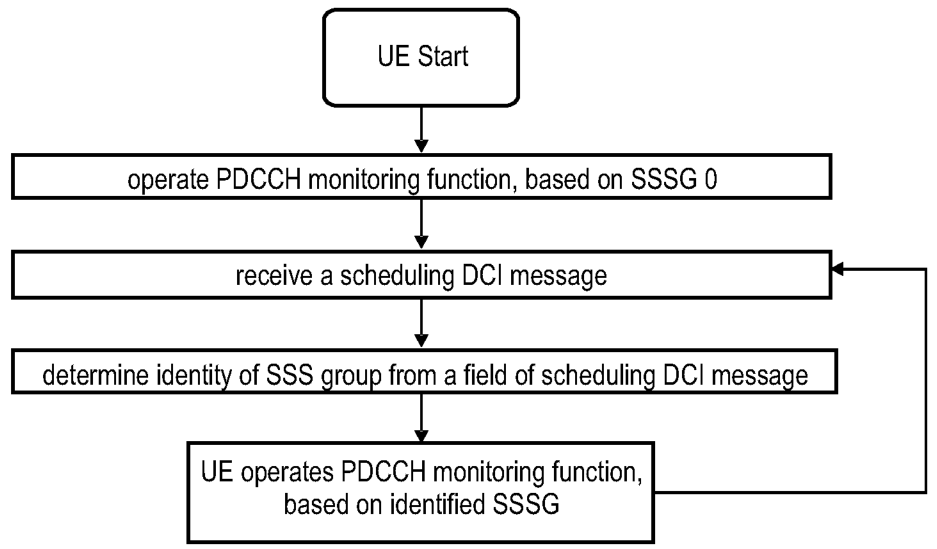
FIG. 24 is a flow diagram for the UE behavior, according to a second solution of the improved PDCCH monitoring procedure.

An exemplary implementation of the second solution is illustrated in FIG. 24, which shows the UE behavior. As apparent therefrom, after receiving a scheduling DCI message, the UE determines the identity of the SSS group from a field of the scheduling DCI message. Then, the UE proceeds to perform the monitoring function based on the identified SSSG.

Two alternative variants of the second solution will be discussed below.

According to a first variant of the second solution, the scheduling DCI includes a field, which includes a value that identifies the SSS group to be used. The field can be, e.g., called search space set group field (SSSG field) and would be a separate field in the DCI. For instance, in case there are only two SSS groups, the SSSG field need only have one bit in order to distinguish between the two SSSG; bit value 0 identifying SSSG 0, and bit value 1 identifying SSSG 1. On the other hand, the SSSG field can have more than one bit, in order to distinguish between more than two SSS groups.

According to a second variant of the second solution (which can be in addition or alternatively to the first variant), the SSSG identity is jointly encoded into a resource allocation field, which, e.g., indicates time-domain scheduling parameters relating to the allocated transmission/reception. Put differently, the resource allocation field of the scheduling DCI allows the UE tot determine both the time-domain scheduling parameters as well as the identity of the SSS group that the UE is to use. Compared to the first variant, this second variant has the benefit that the scheduling DCI does not have a separate field for the identification of the SSSG, thereby reducing the overhead.

According to one exemplary implementation, the time-domain scheduling can be based on a suitable time-domain resource allocation (TDRA) table (such as the one provided by the 5G NR standards). Accordingly, the various sets of time-domain scheduling parameters of the TDRA table could further indicate the SSSG identity. Thus, when the resource allocation field of the scheduling DCI indicates which set of parameters to use from the TDRA table, the resource allocation field also identifies the SSSG the UE has to use for the monitoring function.

The following exemplary TDRA table could be fixed in a suitable 5G NR standard or could be configurable by the gNB (e.g., using RRC).

| TDRA Table | | | | | | | |
|---|---|---|---|---|---|---|---|
| Row index | dmrs-TypeA-Position | PDSCH mapping type | $K_0$ | S | L | Repetition Number | SSSG Index |
| 1 | 2 | Type A | 0 | 2 | 12 | — | 0 |
| | 3 | Type A | 0 | 3 | 11 | — | 0 |
| 2 | 2 | Type A | 0 | 2 | 12 | n2 | 0 |
| | 3 | Type A | 0 | 3 | 11 | n2 | 0 |
| 3 | 2 | Type A | 0 | 2 | 12 | n3 | 1 |
| | 3 | Type A | 0 | 3 | 11 | n3 | 1 |
| 4 | 2 | Type A | 0 | 2 | 12 | n4 | 1 |
| | 3 | Type A | 0 | 3 | 11 | n4 | 1 |
| 5 | 2 | Type A | 0 | 2 | 10 | — | 0 |
| | 3 | Type A | 0 | 3 | 9 | — | 0 |
| 6 | 2 | Type A | 0 | 2 | 9 | — | 0 |
| | 3 | Type A | 0 | 3 | 8 | — | 0 |
| 7 | 2 | Type A | 0 | 2 | 7 | — | 0 |
| | 3 | Type A | 0 | 3 | 6 | — | 0 |
| 8 | 2 | Type A | 0 | 2 | 5 | — | 0 |
| | 3 | Type A | 0 | 3 | 4 | — | 0 |
| 9 | 2 | Type B | 0 | 9 | 4 | — | 0 |
| | 3 | Type B | 0 | 10 | 4 | — | 0 |
| 10 | 2 | Type B | 0 | 4 | 4 | — | 0 |
| | 3 | Type B | 0 | 6 | 4 | — | 0 |
| 11 | 2, 3 | Type B | 0 | 5 | 7 | — | 0 |
| 12 | 2, 3 | Type B | 0 | 5 | 2 | — | 0 |
| 13 | 2, 3 | Type B | 0 | 9 | 2 | — | 0 |
| 14 | 2, 3 | Type B | 0 | 12 | 2 | — | 0 |
| 15 | 2, 3 | Type A | 0 | 1 | 13 | — | 0 |
| 16 | 2, 3 | Type A | 0 | 1 | 6 | — | 0 |
| 17 | 2, 3 | Type A | 0 | 2 | 4 | — | 0 |
| 18 | 2, 3 | Type B | 0 | 4 | 7 | — | 0 |
| 19 | 2, 3 | Type B | 0 | 8 | 4 | — | 0 |

As apparent from the exemplary table, each set of time-domain scheduling parameters is put in a row of the table and is associated with a row index, as indicated by the scheduling DCI. In this particular example, a repetition of the transmission (here only an example, could also be a multi-TTI scheduling of different TBs) can be instructed by the base station for the set of time-domain scheduling parameters indexed by row index values 2, 3, and 4. Furthermore, the corresponding SSSG index is provided for each row.

As apparent from the above TDRA table, the SSSG index associated with row index 2 (thus with a repetition number of n2; a multi-TTI transmission) is also SSSG 0 (e.g., assumed to define monitoring occasions at every slot), while the SSSG index associated with row indexes 3 and 4 (thus with a repetition numbers of n3 respectively n4; also multi-TTI transmission) is a different SSS group, SSSG 1 (e.g., assumed to have less PDCCH monitoring occasions, e.g., every $4^{th}$ slot)). For instance, if row 2 is indicated in a DCI at slot n, the UE still monitors every slot (i.e., stay in SSSG 0), although slot n schedules PDCCH repetition over slot n and slot n+1.

Moreover, this gives the gNB the opportunity to transmit another DCI in slot n+1 to schedule another PDSCH using, e.g., row index 1. This would be possible because in slot n+1, two PDSCHs are transmitted over different frequency resources, although they both spans same number of symbols in time.

It should be also noted that in the above exemplary TIARA table, for entry 3, one DCI schedules 3 transmissions, but the UE monitors PDCCH every 4th slot, i.e., stay in SSSG 1. For instance, the gNB does not want to switch the SSS group, but wants to temporally reduce the number of repetitions, e.g., in case of improved channel condition, or the data in the buffer for the UE is less enough to fit into n3 transmission.

Further variants of the second solution incorporate the use of a switching time as an additional mechanism to switch between the different SSS groups. This could be useful in cases where the UE misses a scheduling DCI carrying the SSSG indication. Generally, the UE determines a new SSS group for performing the monitoring function after a switching period of time expires, where the switching time period is started when having started to monitor the downlink control channel according to the currently-used SSS group.

The time-based switching mechanism can also be used when there are more than two SSS groups available for the improved PDCCH monitoring procedure. In that case, upon expiry of the time, the UE may use the default (or initial) SSSG, or another fixed SSSG (among the various SSSGs, different from the default SSSG), or the SSS group that the UE used previously to the currently-used SSSG (that caused the switching time to start).

Such a switching time thus provides another possibility of how to change between SSS groups, and can be implemented for one, some or all possible SSS group transitions. For instance, as will be explained below in connection with FIGS. 25 and 26, the time-based switching is only available for switching back to the default SSS group 0, but not from SSS group 0 to another SSS group (such as SSSG 1). However, this is only an example, and the UE might switch to another, pre-determined SSS group, or to the previously-used SSS group after the switching time period expires.

Moreover, according to exemplary implementations, a timer might be used by the UE to monitor the switching time period.

Figure 25:
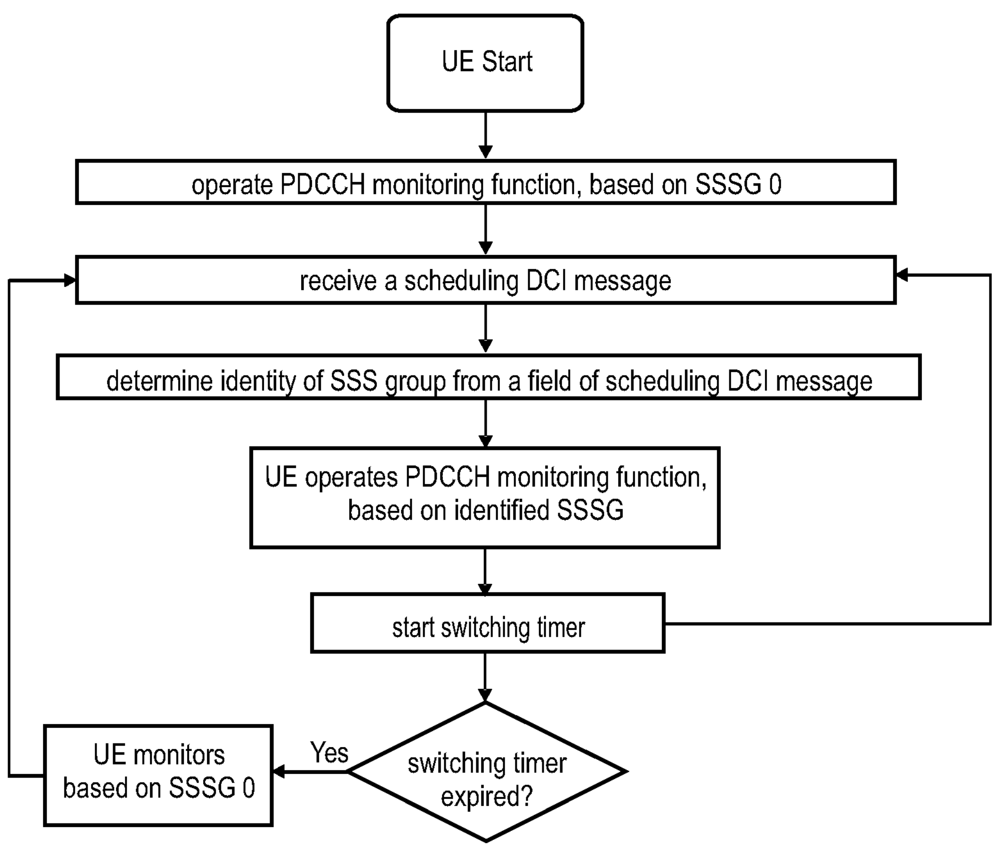
FIG. 25 is a flow diagram for the UE behavior, according to a variant of the second solution of the improved PDCCH monitoring procedure.
Figure 26:
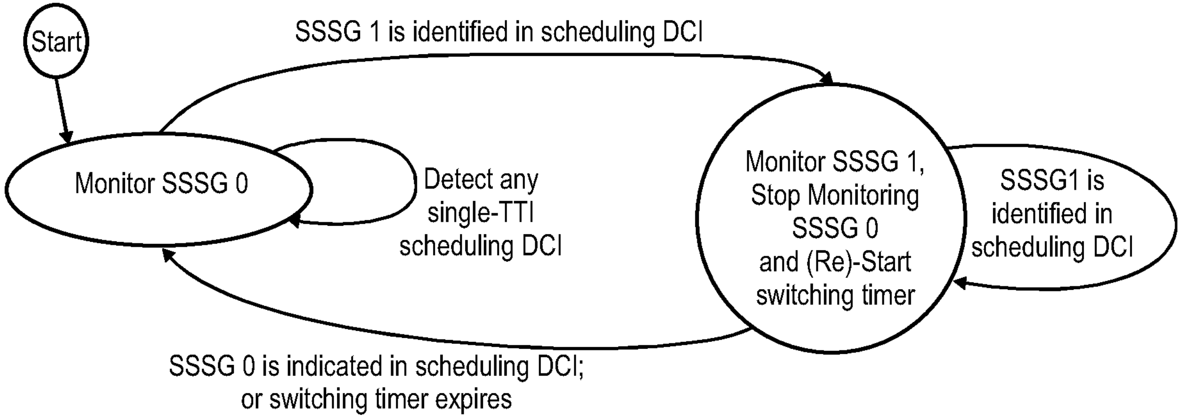
FIG. 26 is a state change diagram for the UE, according to a variant the second solution of the improved PDCCH monitoring procedure.

FIG. 25 is a flow diagram of the UE behavior for an exemplary implementation of the timer-based variant of the second solution. Moreover, FIG. 26 is a state diagram for the UE, similar to the implementations according to FIGS. 24 and 25. In both cases, it is exemplarily assumed that the UE starts monitoring the PDCCH based on a default SSSG 0, which could, e.g., either provide dense or sparse monitoring occasions.

As apparent from FIG. 25, when determining the SSS group and performing the PDCCH monitoring based on that determined SSS group, the UE further starts a switching timer. Upon expiry of said switching timer (and assuming that no scheduling DCI indicating SSSG 0 is received in the UE before the expiry of the switching timer), the UE switches back to monitoring the PDCCH based on the default SSSG 0.

FIG. 26 similarly illustrates the state transitions between the states of "Monitor SSSG 0" and "Monitor SSSG 1." As apparent, the state transition from non-default SSSG 1 to default SSSG 0 is also possible based upon the timer expiry (see also FIG. 25). Furthermore, FIG. 26 illustrates the optional possibility of restarting the switching timer, when the same SSSG 1 is again instructed, there prolonging the period of time that the UE keeps monitoring the downlink control channel based on SSSG 1.

According to further variants of the second solution, at least some of all the SSS groups are respectively used for receiving DCI messages allocating a different number of transmissions/receptions.

For instance, when assuming two SSS groups, a specific configuration of the different SSS groups associates one SSS group unambiguously with, e.g., the single-TTI scheduling and associates another different SSS group unambiguously with, e.g., the multi-TTI scheduling. Correspondingly, a scheduling DCI for a single TTI would be transmitted by the base station in monitoring occasions defined by the corresponding single-TTI-related SSS group. Conversely, a scheduling DCI for multiple TTI would be transmitted by the base station in monitoring occasions defined by the corresponding multi-TTI-related SSS group.

In case there are more than two SSS groups, one exemplary solution is that the scheduling granularity of the multi-TTI scheduling could be taken into account, where one SSS group is used to carry scheduling DCIs allocating the same (or similar) number of transmission/receptions. For instance, SSSG 0 always schedules single-TTI transmissions/receptions, SSSG 1 always schedules multi-TTI with 2 transmissions/receptions, SSSG 2 always schedules multi-TTI with 3 transmissions/receptions.

As a possible addition, the single-TTI-related SSS group would define comparatively dense monitoring occasions, in order to allow good flexibility for possible subsequent single-TTI scheduling. On the other hand, the multi-TTI-related SSS group would define comparatively sparse monitoring occasions (e.g., depending on the scheduling granularity of the multi-TTI scheduling), thereby allowing the UE to save power by skipping the PDCCH monitoring in some time slots.

This way, the PDCCH monitoring periodicity of the different SSS groups would match well the scheduling granularity of the corresponding scheduling DCIs carried in the respective SSS group.

For such a configuration of the SSS groups, an implicit indication as discussed in the above first solution for switching between different SSS groups is difficult to implement, because when the UE monitors according to one SSS group, scheduling DCIs relating to only that SSS group would be received by the UE, but not scheduling DCIs related to other SSS groups that would implicitly trigger the switch to those other SSS groups (see first solution, FIG. 18). On the other hand, the second solution that provides an explicit indication of the SSS group can well be used, e.g., where the single-TTI scheduling DCI could identify a multi-TTI-related SSS group for future PDCCH monitoring, so as to allow the base station to then send a multi-TTI scheduling DCI.

The above second solution (and its variant) can also be implemented at the base station. As already mentioned generally above, the base station performs steps that correspond to those at the UE-side, so as to allow the base station to determine how the UE monitors the PDCCH and then be able to perform accordingly (e.g., transmit the next scheduling DCIs).

In the present second solution, particularly for the first variant, of using an explicit SSSG field, the base station behavior thus includes the processing of determining that SSS group the UE is to use afterwards for performing the PDCCH monitoring function. According to the first variant of the second solution, the base station would then set the SSSG field of the scheduling DCI to a particular value in correspondence with the determined future SSS group.

Such a step of determining the future SSS group to be used by the UE, need not, but can also be performed for the second variant of the second solution, such that the suitable set of time-domain scheduling parameters (and the SSS group associated therein) is determined taking into account the determined future SSS group. The base station then sets the resource allocation field of the scheduling DCI to a particular value in correspondence with the determined set of time-domain scheduling parameters.

Differently, in the first solution(and also the third solution, presented below), the switching of the SSS groups occurs as a direct result of the scheduling decisions made at the base station. A separate step of determining the SSS group that the UE is to use in the future is not necessarily performed at the base station. For instance, when scheduling a single-TTI transmission/reception, the corresponding SSS group is automatically associated, such that, a separate SSS group determination is not necessary; similarly, for when the base station determines a multi-III transmission/reception. Nevertheless, the base station may know how the UE is monitoring the PDCCH, particularly based on which SSS group, in order to deliver the DCI to UE when needed.

In the context of the second solution, particularly for the second variant that is based on suitably configured sets of time-domain scheduling parameters, the base station might be responsible for defining those sets of time-domain scheduling parameters and configuring the UEs accordingly. Therefore, the base station generates a suitable configuration message (e.g., as part of the RRC layer), and transmits the configuration message to a UE. Thus, the UE has the suitable information available for being later scheduled with a resource allocation field to identify the time-domain scheduling parameters as well as the instructed SSS group. Put generally, the configuration message provides the UE with associations between different SSS groups and different values of the resource allocation field of the scheduling DCI.

In specific implementations, the base station defines a TDRA table (see, e.g., 5G NR standard discussion) by use of a RRC message.

Correspondingly, because the base station separately and actively determined the SSS group the UE should use in the future, it should know at all times how the UE is monitoring the PDCCH, particularly based on which SSS group.

In other time-based variants of the second solution, the behavior of the base station thus also incorporates the monitoring of a switching time period (and optionally incorporates the operation of a timer to monitor the switching time period) so as to determine when the UE switches back to another SSS group after expiry of the switching time period.

Third Solution—Implicit Indication of SSS Group Based on Priority of Scheduled Data A third solution (and variants thereof) is presented in the following on how the UE determines the SSSG it should use for the PDCCH monitoring function based on the scheduling DCI.

A third solution is based on the priority of the data that is scheduled by the DCI. Correspondingly, the UE determines the priority of the data of the transmission/reception allocated by the scheduling DCI, and then, on the basis of the priority, the SSS group it will use for the monitoring function.

An exemplary implementation distinguishes between high-priority data traffic and low-priority data traffic. The priority could be related to one or more particular traffic characteristics, such as the latency requirements.

For instance, high-priority data traffic could be data for, e.g., URLLC, where the low-latency requirements benefit from an SSS group with relatively dense monitoring occasions. Conversely, low-priority data traffic could be data for, e.g., eMBB, where the relaxed latency requirements allow for relatively sparse monitoring occasions of an SSS group (thus allowing for power-saving opportunities).

The UE thus performs the PDCCH monitoring based on an SSS group that matches the priority of the scheduled data traffic and its characteristics (such as the latency requirements).

Figure 27:
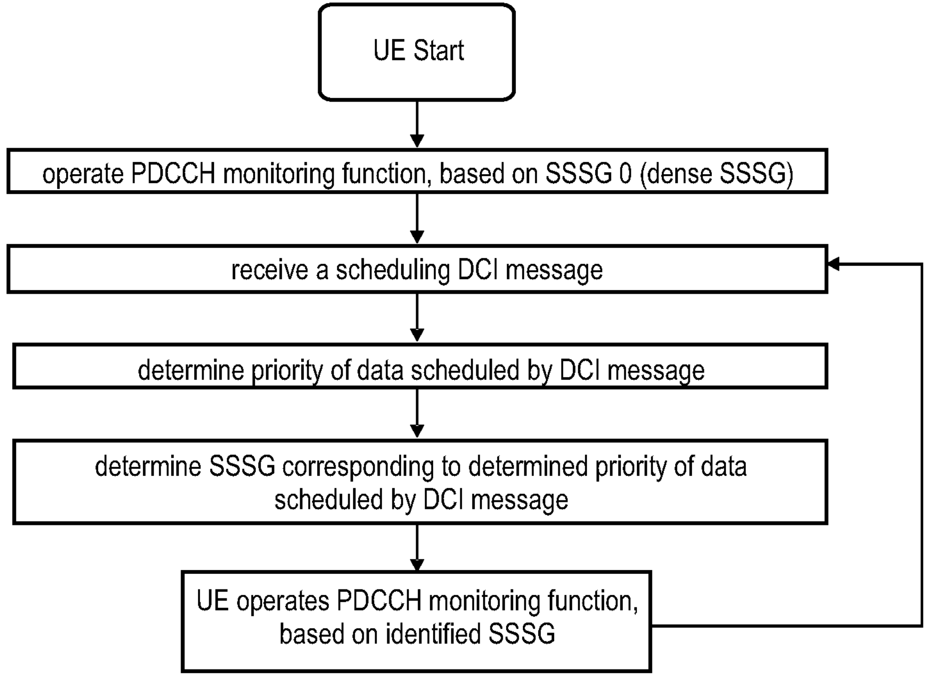
FIG. 27 is a flow diagram for the UE behavior, according to the third solution of the improved PDCCH monitoring procedure.

A corresponding exemplary UE behavior according to this third solution is illustrated in FIG. 27. As apparent therefrom, the UE determines first the priority of the data scheduled by the DCI message, and then proceeds to determine that SSS group that corresponds to the determined priority. The PDCCH monitoring is then performed according to the determined SSS group.

There are several possibilities of how the UE is able to determine the priority of data transmission/reception allocated by the scheduling DCIs. For instance, the priority may be independent from whether the scheduling DCI schedules a single-TTI transmission/reception or multi-TTI transmissions/receptions.

In a first variant of the third solution, the scheduling DCI may include a suitable priority field, which directly indicates the priority of the allocation, and thus allows to derive the SSS group associated with the priority.

According to a second variant of the third solution, the priority can be derived by the UE based on the format of the scheduling DCI. For instance, the scheduling DCI can be transmitted in different formats, where the formats are associated with different priorities. In an exemplary 5G NR-standard-compliant implementation, URLLC traffic can be scheduled with a DCI message of format 1_2, and eMBB traffic can be scheduled with a DCI message of format 1_0 or 1_1. Thus, when the UE determines that the decoded DCI message is of format 1_2, it will derive that the scheduled traffic is of high priority (URLLC) and will use a suitable SSS group with dense monitoring occasions. When the UE determines that the decoded DCI message is of format 1_0 or 1_1, it will derive that the scheduled traffic is of low priority (eMBB) and will use a suitable SSS group with sparse monitoring occasions The UE in any variant has suitable information available so as to be able to derive an SSS group from the determined data traffic priority of the scheduling DCI. This information can, e.g., be fixed in a standard, or can be provided by the base station in a configuration message (e.g., using RRC).

The above third solution (and its variant) can also be implemented at the base station. As already mentioned generally above, the base station performs steps that correspond to those at the UE-side, so as to allow the base station to determine how the UE monitors the PDCCH and then be able to perform accordingly (e.g., transmit the next scheduling DCIs).

In the present third solution, the base station can simply determine the priority of the traffic that it has scheduled for the UE, so as to derive (in a corresponding manner as the UE), which SSS group the UE will be using for its monitoring function (and thus how to perform future transmissions of scheduling DCIs).

According to the first variant of the third solution, the base station determines the priority of the data it wants to allocate by the scheduling DCI, and then sets the priority field of the scheduling DCI accordingly. As explained above, this allows the UE to identify the priority of the allocated data transmission/reception based on the priority field.

According to the second variant of the third solution, the base station generates the scheduling DCI based on a suitable format that is indicative of the priority of the allocated data. Then, the base station performs a corresponding determination of the priority based on the format of the previously-transmitted scheduling DCI, so as to determine which SSS group the UE is currently monitoring.

Further Variants

Numerous variants and implementations of the improved downlink channel monitoring procedure have been described. For instance, three different solutions (and respective variants) have been described as to how the UE can determine which SSS group the UE should use for the monitoring function based on the content or format of the scheduling DCI. Some of these have been described separately from one another in order to be facilitate the understanding of the underlying mechanisms and benefits of the respective variant or implementation.

According to further solutions, the UE can support a combination of some or all of the above discussed solutions to form new variants and implementations of the improved procedures. Without being exhaustive, a few of these implementations that can be combined are listed in the following.

In one exemplary implementation, the UE could be initially configured (e.g., by the base station) to perform the improved downlink channel monitoring procedure based on one of the solutions (or variants). The UE then could also be re-configured as needed.

In addition, or alternatively, the UE could be operating according to more than one solution (or variant thereof) at the same time. For instance, the UE could be able to follow an explicit. indication of the SSS group (see second solution) but additionally follow the implicit switching based on the single-vs-multi-TTI solution (see first solution). Other combinations of the solutions are equally possible.

Such a combination of two car more solutions could be beneficial, e.g., when there are more than two SSS groups. According to one such exemplary implementation, the UE is enabled to follow the implicit switching based on only two of the various SSS groups (e.g., switching between a single-TTI-related SSSG and a multi-TTI-related SSSG). On the other hand, one or more of the remaining SSS groups could then (only) be used by the UE when being explicitly instructed by the base station, e.g., using the explicit signaling of the second solution (and its implementations and variants).

In the above solutions, it was assumed that the UE performs a monitoring function on the downlink control channel (e., the PDCCH in 3GPP-implemented solutions) for receiving DCI messages from the base station. According to further exemplary solutions, that can be combined with other solutions, the scheduling DCI, for which the UE monitors the PDCCH, according to this improved PDCCH monitoring procedure, is typically transmitted in a UE-specific search space or in a type-3 common search space (see TS 38.213 v16.1.0 section 10.1 for definition of different types of common search spaces). Other common search spaces, such as type-0, type-0A, type-1, type-2 which are used for transmission of broadcast system information, are monitored independently from these search spaces and independently from the SSSG switching explained above (e.g., for receiving a broadcast PDCCH).

According to further exemplary solutions, that can be combined with other solutions, further restrictions on the SSS groups can be defined, such as that different SSS groups are defined over the same control resource set (CORESET). Furthermore, the sparse monitoring occasions defined for one SSS group could be a subset of the dense monitoring occasions for another SSS group in that same CORESET. Such a definition of the SSS groups and their monitoring occasions would ease error recovery. For instance, a scenario is assumed where the scheduling DCI carrying the explicit group switching indication is missed by the UE due to, e.g., channel fading. Consequently, the base station and the UE may have a different understanding of which SSSG shall be used. In order to resolve such uncertainty, the base station can send a new DCI over the PDCCH monitoring occasions that occur in both SSSGs (i.e., overlapping occasions between different SSSGs). Regardless of which SSSG UE is currently monitoring, the UE is able to receive the new DCI. By decoding the new DCI, the UE knows the SSSG indication from the base station. As a result, the potential mismatch issue is resolved.

According to further exemplary solutions, that can be combined with other solutions, the improved PDCCH monitoring procedure can be applied to a single serving cell of the UE only, or alternatively, applied to specific or all serving cells (e.g., within a cell group). This can, e.g., be configured by the base station, in a corresponding configuration (e.g., by RRC).

In some of the above solutions and variants of the improved PDCCH monitoring procedure, a default SSS group is mentioned, with which the UE initially starts to perform the monitoring function. For instance, the default SSSG could be applied right after the configuration of the SSGs (e.g., by RRC). Exemplary other conditions as to when to use the default SSSG could include the following:

- The default SSSG could be used when waking up at the beginning of the DRX cycle (e.g., when the On Duration timer starts).
- The default SSSG could be used when waking up as triggered by the DCI format 2_6, meaning that UE resumes PDCCH monitoring after a time period of sleep.
- The default SSSG could be used at the beginning of a channel occupancy time period, when operating in an unlicensed band.
- The default SSSG could be used upon expiry of a timer, e.g., where the tinier could be a prohibition timer or switching tinier as mentioned earlier in the solutions.

According to further exemplary solutions, that can be combined with other solutions, the DRX operation can also be considered. In brief, the Discontinued-Reception (DRX) function is a mechanism to minimize the time the UE spends monitoring the PDCCH, so as to reduce battery consumption. The DRX function defines DRX periods (during which the UE is not required to monitor the PDCCH) and active-time periods (during which the UE is required to fulfil its requirements of monitoring the PDCCH). Defining the DRX function involves defining numerous parameters, timers, etc.; such as the On Duration, the DRX inactivity timer, the DRX short cycle, the DRX long cycle. The standardization in 5G NR has defined DRX in 3GPP TS 38.321 v16.0.0 section 5.7 titled "Discontinuous Reception (DRX)."

According to a first implementation, the improved PDCCH monitoring procedure does not have any impact on the DRX function operated by the UE, e.g., the parameters and timers of the DRX function are not adapted or synchronized with the improved PDCCH monitoring procedure.

According to another implementation, some of the DRX-related timers and/or parameters are continuously adjusted according to the SSSG currently-used by the UE for performing the monitoring function. For instance, a timer value is scaled in accordance with the PDCCH monitoring periodicity of the currently-used SSSG. In more detail, as one example, there are two SSSGs configured, SSSG 0 with PDCCH monitoring periodicity of 4 slots, and SSSG 1 with 1 slot. Accordingly, DRX inactivity timer has two configured values, 4n and n, corresponding to the different SSSGs respectively. The purpose of DRX inactivity timer is to define a time duration during which, if no PDCCH is received, the UE would go to sleep after it expires. Since the PDCCH monitoring requirement is different between SSSG 0 and SSSG 1, to scale the DRX inactivity timer accordingly as described reflects better with the original purpose of such timer.

Whether or not the DRX function is adapted/synchronized with the improved PDCCH monitoring function can be either be fixed in the 3GPP standard(s) or can be configurable by the base station (e.g., using RRC messages).

In variants of the above first and second solutions, a time (and optionally timers) is used to further improve the SSSG switching operation. According to further variants, the time (and optionally timers) can be configured specifically, as described in the following.

The timer values can be configured per serving cell (or per serving cell group if cell group is configured). Thus, only one single timer value needs to be maintained across different SSSGs.

As long as a non-default SSSG is monitored, the timer value is decremented (or incremented) (e.g., in unit of slot of a reference SCS (subcarrier spacing)) (e.g., unless the restart condition is met for the timer).

Alternatively, the timer value can be configured per bandwidth part or per non-default SSSG, which provides more flexibility at the price of complexity in the sense that multiple timers need to be tracked by the UE (and also the base station). Also in this case, the timer value is decremented (or incremented) (e.g., in unit of slot (or unit of TTI), using the SCS of the monitored SSSG) (unless the restart condition is met for the timer).

Further Aspects

According to a first aspect, a user equipment, is provided that includes the following. A processor of the UE operates a monitoring function that involves monitoring of a downlink control channel for receiving a downlink control information message based on one of a plurality of groups of search space sets. A receiver of the UE receives a downlink control information message via the monitored downlink control channel, wherein the received downlink control information message allocates transmission or reception of data to the UE. The processor further determines one group of the plurality of groups of search space sets for performing the monitoring function of the downlink control channel. The determining the one group of search space sets is based on:

- the content or the format of the received downlink control information message.

According to a second aspect provided in addition to the first aspect, determining the one group of search space sets for performing the monitoring function is performed by the processor based on:

- the number of transmissions or receptions allocated by a base station to the UE by the content of the downlink control information message.

In an optional implementation, in case the number of transmissions or receptions is one, a group of search space sets is determined that has a short periodicity of required monitoring occasions. In case the number of transmissions or receptions is larger than one, a group of search space sets is determined that has a long periodicity of required monitoring occasions. In a further optional implementation, the processor, when determining the one group of search space sets for performing the monitoring function, determines a group of search space sets having a periodicity of the required monitoring occasions that corresponds to the number of transmissions or receptions allocated by the downlink control information message.

According to a third aspect provided in addition to the second aspect, the processor, when in operation, prohibits determining a group of search space sets that is different from a currently-used group of search space sets for a prohibition time period after having determined the currently-used group of search space sets based on the number of transmissions or receptions. In an optional implementation, the processor, when determining to use a group of search space sets for performing the monitoring function that is different from a currently-used group of search space sets, starts a prohibition timer. The processor, after starting the prohibition timer and during a run-time of the prohibition timer, does not determine to use a group of search space sets that is different from a currently-used group of search space sets. In a further optional implementation, the prohibition timer is restarted every time the processor determines that group of search space sets for performing the monitoring function that caused the start of the prohibition timer.

According to a fourth aspect provided in addition to one of the first to third aspects, at least two of the plurality of groups of search space sets differ between each other regarding a periodicity of required monitoring occasions of the downlink control channel to be monitored by the user equipment. The determining of the one group of search space sets determines one of the at least two of the plurality of groups of search space sets so as to perform the monitoring function based on a different periodicity of required monitoring occasions. In an optional implementation, one of the plurality of groups of search space sets is configured to be a default group of search space sets. Further optionally, the default group of search space sets is used initially for performing the monitoring function. In a further optional implementation, the default group of search space sets is a group of search space sets that has a short periodicity of required monitoring occasions or has a long periodicity of required monitoring occasions.

According to a fifth aspect, provided in addition to one of the first to fourth aspects, determining the one group of search space sets for performing the monitoring function is performed by the processor based on:

- a field of the content of the downlink control information message, based on which the processor determines the identity of the group of search space sets to be used to perform the monitoring function.

The field is a search space set group field, identifying the group of search space sets to be used to perform the monitoring function, or the field is a resource allocation field, indicating time-domain scheduling parameters relating to the allocated transmission or reception. The indicated time-domain scheduling parameters also identify the group of search space sets to be used to perform the monitoring function. In an optional implementation, the processor determines one set out of a plurality of sets of time-domain scheduling parameters of a time-domain resource allocation table, based on the value of the resource allocation field of the downlink control information. Each set of time-domain scheduling parameters is associated with a group of search space sets.

According to a sixth aspect, provided in addition to the fifth aspect, the processor determines a group of search space sets for performing the monitoring function that is different from the currently-used group of search space sets, after a switching time period expires. The switching time period had started when starting to use the current group of search space sets. In an optional implementation, the determined different group of search space sets is a default group of search space sets or is the group of search space sets used previous to the currently-used group of search space sets. In a further optional implementation, the processor operates a switching timer for the switching time period.

According to a seventh aspect provided in addition to one of the fifth or sixth aspects, at least some of the plurality of groups of search space sets are respectively used for monitoring the downlink control channel for receiving a downlink control information message indicating respectively different numbers of transmissions or receptions allocated by the base station to the UE. In an optional implementation, one of the some of the plurality of groups of search space sets is used only for monitoring the downlink control channel for receiving a downlink control information message that indicates one transmission or reception allocated by the base station to the UE. Another one of the some of the plurality of groups of search space sets is used only for monitoring the dowinlink control channel for receiving a downlink control information message that indicates more than one transmissions or receptions allocated by the base station to the UE.

According to an eighth aspect provided in addition to one of the first to seventh aspects, determining the one group of search space sets for performing the monitoring function is performed by the processor based on

- a priority of the data of the transmission or reception allocated by the downlink control information message.

In an optional implementation the priority of the data is indicated by a data priority field in the downlink control information message. In further optional implementation, the UE has information on associations between different priorities of data and different groups of search space sets. In a still further optional implementation, the processor determines the priority of the data based on the format of the downlink control information message.

According to a ninth aspect provided in addition to one of the first to eighth aspects, the monitoring function is performed on a time slot basis, or on a mini-time-slot basis. In an optional implementation, a mini-slot spans one or a plurality of OFDM symbols but less than a time slot.

According to a tenth aspect provided in addition to one of the first to ninth aspects, the UE operates a discontinued-reception, DRX, function, including at least one DRX-related timer. The processor adjusts the at least one DRX-related timer, based on the group of search space sets currently used for performing the monitoring function, such as based on the periodicity of the required monitoring occasions of the downlink control channel of that currently-used group of search space sets. Alternatively, the processor, when in operation, does not adjust the at least one DRX-related timer, based on the group of search space sets currently used for performing the monitoring function. In an optional implementation, whether to adjust or not adjust the at least one DRX-related timer based on the currently-used group of search space sets is determined by the processor based on a configuration received from a base station.

According to an eleventh aspect, provided in addition to one of the first to the tenth aspects, the monitoring function is performed for only a single serving cell of the UE or for a plurality of serving cells of the UE. In an optional implementation, the processor determines whether to perform the monitoring function for only the single serving cell or for the plurality of serving cells, based on a configuration received from a base station.

According to a twelfth aspect, provided in addition to the third and sixth aspects, the prohibition time period, and optionally the prohibition timer, is configured per single serving cell or per group of search space sets or per bandwidth part. The switching time period, and optionally the switching timer, is configured per single serving cell or per group of search space sets or per bandwidth part, According to a thirteenth aspect, provided in addition to one of the first to twelfth aspects, the downlink control information message allocates downlink radio resources for the reception of data by the UE, optionally wherein the downlink control information message is of a format 1_0 or 1_1 or 1_2. The downlink control information message allocates uplink radio resources for the transmission of data by the UE, optionally wherein the downlink control information message is of a. format 0_0 or 0_1 or 0_2.

According to a fourteenth aspect, a method is provided. The method comprises the following steps performed by a user equipment, UE. The UE operates a monitoring function that involves monitoring of a downlink control channel for receiving a downlink control information message based on one of a plurality of groups of search space sets. The UE receives a downlink control information message via the monitored downlink control channel, wherein the received downlink control information message allocates transmission or reception of data to the UE. The UE determines one group of the plurality of groups of search space sets for performing the monitoring function of the downlink control channel. Determining the one group of search space sets is based on the content or the format of the received downlink control information message.

According to a fifteenth aspect, a base station is provided comprising the following. A processor of the base station generates a downlink control information message. The generated downlink control information message allocates transmission or reception of data to the UE. The content or the format of the generated downlink control information message is such that a user equipment is able to determine one group of a plurality of groups of search space sets, to be used by the user equipment for performing a monitoring function that involves monitoring of a downlink control channel for receiving a downlink control information message. The processor determines a group of the plurality of groups of search space sets, currently used by the user equipment for performing the monitoring function. The determining of the currently-used group of search space sets is based on the content or format of another downlink control information message previously transmitted to the user equipment. A transmitter of the base station transmits the generated downlink control information message via the downlink control channel to the user equipment, based on the determined currently-used group of search space sets.

According to a sixteenth aspect, provided in addition to the fifteenth aspect, the determining of the currently-used group of search space sets is performed by the processor based on:

- the number of transmissions or receptions allocated by a base station to the UE by the content of the previously-transmitted downlink control information message.

In an optional implementation, the determining of the currently-used group of search space sets is performed by the processor based on:

- a prohibition time period, which prohibits the user equipment from determining a second group of search space sets that is different from a first group of search space sets after having determined the first group of search space sets based on the number of transmissions or receptions.

According to a seventeenth aspect, provided in addition to the fifteenth aspect, the processor determines the one group of a plurality of groups of search space sets, to be used by a user equipment for performing a monitoring function that involves monitoring of a downlink control channel for receiving a downlink control information message. The processor, when in operation, sets a search space set group field of the content of the downlink control information message to identify the determined group of search space sets.

According to an eighteenth aspect, provided in addition to the fifteenth aspect, the transmitter transmits a configuration message to the UE, the configuration message providing information on associations between different values of a resource allocation field and different groups of the plurality of groups of search space sets. The transmitted downlink control information message includes the resource allocation field with a value that indicates time-domain scheduling parameters that relate to the allocated transmission or reception. In an optional implementation, the configuration message provides information on a time-domain resource allocation table, which defines different sets of time-domain scheduling parameters for different values of the resource allocation field.

According to a nineteenth aspect, provided in addition to the seventeenth or eighteenth aspect, the determining of the currently-used group of search space sets is performed by the processor based on:

- a switching time period, started when using a first group of search space sets, wherein after the switching time period expires, the UE determines a group of search space sets for performing the monitoring function that is different from the first group of search space sets.

According to a twentieth aspect, provided in addition to one of the fifteenth to nineteenth aspects, the determining of the currently-used group of search space sets is performed b the processor based on:

- a priority of the data of the transmission or reception allocated by the previously-transmitted downlink control information message.

In an optional implementation, the processor determines the priority of the data of the transmission or reception to be allocated by the downlink control message. The processor sets a data. priority field in the content of the downlink control message based on the determined priority.

According to a 21$^{st}$ aspect, a method is provided comprising the following steps performed by a base station. The base station generates a downlink control information message, wherein the generated downlink control information message allocates transmission or reception of data to the UE. The content or the format of the generated downlink control information message is such that a user equipment is able to determine one group of a plurality of groups of search space sets, to be used by the user equipment for performing a monitoring function that involves monitoring of a downlink control channel for receiving a downlink control information message. The base station determines a group of the plurality of groups of search space sets, currently used by the user equipment for performing the monitoring function. The determining the currently-used group of search space sets is based on the content or format of another downlink control information message previously transmitted to the user equipment. The base station transmits the generated downlink control information message via the downlink control channel to the user equipment, based on the determined currently-used group of search space sets.

According to a 22nd aspect, an integrated circuit is provided, which, in operation, control a process of a user equipment, the process comprising the following steps performed by the user equipment:

operating a monitoring function that involves monitoring of a downlink control channel for receiving a downlink control information message based on one of a plurality of groups of search space sets, receiving a downlink control information message via the monitored downlink control channel, wherein the received downlink control information message allocates transmission or reception of data to the UE, determining one group of the plurality of groups of search space sets for performing the monitoring function of the downlink control channel, wherein determining the one group of search space sets is based on:

the content or the format of the received downlink control information message.

According to a 23rd aspect, an integrated circuit is provided, which, in operation, control a process of a base station, the process comprising the following steps performed by the base station:

generating a downlink control information message, wherein the generated downlink control information message allocates transmission or reception of data to the UE, and wherein the content or the format of the generated downlink control information message is such that a user equipment is able to determine one group of a plurality of groups of search space sets, to be used by the user equipment for performing a monitoring function that involves monitoring of a downlink control channel for receiving a downlink control information message, determining a group of the plurality of groups of search space sets, currently used by the user equipment for performing the monitoring function, wherein the determining the currently-used group of search space sets is based on the content or format of another downlink control information message previously transmitted to the user equipment, and transmitting the generated downlink control information message via the downlink control channel to the user equipment, based on the determined currently-used group of search space sets.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RE (radio frequency) module including amplifiers, RF modulators/demodulators and the like, and one or more antennas.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT).

The communication may include exchanging data through, for example, a cellular system, a wireless LAN system, a satellite system, etc., and various combinations thereof.

The communication apparatus may comprise a device such as a controller or a sensor, which is coupled to a communication device performing a function of communication described in the present disclosure. For example, the communication apparatus may comprise a controller or a sensor that generates control signals or data signals, which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The invention claimed is:

1. A communication apparatus, comprising:

a processor, which, in operation, operates a monitoring function that involves monitoring of a downlink control channel, and a receiver, which, in operation, receives a downlink control information message via the monitored downlink control channel, wherein the received downlink control information message schedules transmission or reception of data to the communication apparatus, wherein the processor, in a first case, determines a search space set group (SSSG) out of more than two SSSGs for performing the monitoring function of the downlink control channel based on the received downlink control information message including a field having more than one bit to identify the determined SSSG, the processor, when the determined SSSG is not SSSG 0, switches from the determined SSSG to SSSG 0 after a switching time period expires, and the processor, in a second case, determines a time duration for which to skip the monitoring function based on the received downlink control information message.

2. The communication apparatus according to claim 1, wherein the switching time period is configured per single serving cell or per SSSG or per bandwidth part.

3. The communication apparatus according to claim 1, wherein SSSG 0 is a default SSSG, and wherein the processor operates a switching timer for the switching time period.

4. The communication apparatus according to claim 1, wherein at least some of the more than two SSSGs are respectively used for monitoring the downlink control channel for receiving a downlink control information message indicating respectively different numbers of transmissions or receptions scheduled by a base station to the communication apparatus, wherein:

one of the some of the more than two SSSGs is used only for monitoring the downlink control channel for receiving a downlink control information message that indicates one transmission or reception scheduled by the base station to the communication apparatus, and another one of the some of the more than two SSSGs is used only for monitoring the downlink control channel for receiving a downlink control information message that indicates more than one transmissions or receptions scheduled by the base station to the communication apparatus.

5. The communication apparatus according to claim 1, wherein the monitoring function is performed on a time slot basis, or on a mini-time-slot basis, wherein a mini-slot spans one or a plurality of OFDM symbols but less than a time slot.

6. The communication apparatus according to claim 1, wherein the monitoring function is performed for only a single serving cell of the communication apparatus or for a plurality of serving cells of the communication apparatus, and wherein the processor, when in operation, determines whether to perform the monitoring function for only the single serving cell or for the plurality of serving cells, based on a configuration received from a base station.

7. The communication apparatus according to claim 1, wherein the time duration, for which the communication apparatus skips the monitoring function, is out of two or more time durations.

8. The communication apparatus according to claim 1, wherein the switching time period is decremented in unit of slot of a reference SCS (subcarrier spacing).

9. The communication apparatus according to claim 1, wherein one of the first case or the second case is configured by RRC signaling.

10. A method comprising the following steps performed by a communication apparatus:

operating a monitoring function that involves monitoring of a downlink control channel, receiving a downlink control information message via the monitored downlink control channel, wherein the received downlink control information message schedules transmission or reception of data to the communication apparatus, determining a search space set group (SSSG) out of more than two SSSGs for performing the monitoring function of the downlink control channel based on the received downlink control information message including a field having more than one bit to identify the determined SSSG, when the determined SSSG is not SSSG 0, switching from the determined SSSG to SSSG 0 after a switching time period expires, and determining a time duration for which to skip the monitoring function based on the received downlink control information message.

11. A base station comprising:

a processor, which, in operation, generates a downlink control information message, wherein the generated downlink control information message schedules transmission or reception of data to a communication apparatus, and wherein the generated downlink control information message includes a field having more than one bit to identify a search space set group (SSSG) out of more than two SSSGs used by the communication apparatus for performing a monitoring function that involves monitoring of a downlink control channel for receiving the downlink control information message, and a transmitter, which, in operation, transmits the downlink control information message via the downlink control channel to the communication apparatus, based on the identified SSSG, wherein, when the identified SSSG is not SSSG 0, the communication apparatus switches from the identified SSSG to SSSG 0 after a switching time period expires, and wherein the downlink control information message is associated with a time duration, for which the communication apparatus skips the monitoring function.

* * * * *